(12) United States Patent
Jeon et al.

(10) Patent No.: US 12,455,461 B2
(45) Date of Patent: Oct. 28, 2025

(54) WEARABLE ELECTRONIC DEVICE FOR PROVIDING VIRTUAL IMAGE

(71) Applicant: Samsung Electronics Co., Ltd., Suwon-si (KR)

(72) Inventors: Jina Jeon, Suwon-si (KR); Jinchoul Lee, Suwon-si (KR); Yeotak Youn, Suwon-si (KR); Sehyun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 105 days.

(21) Appl. No.: 17/902,231

(22) Filed: Sep. 2, 2022

(65) Prior Publication Data

US 2022/0413308 A1 Dec. 29, 2022

Related U.S. Application Data

(63) Continuation of application No. PCT/KR2021/001824, filed on Feb. 10, 2021.

(30) Foreign Application Priority Data

Mar. 3, 2020 (KR) .................. 10-2020-0026771

(51) Int. Cl.
*G02B 27/01* (2006.01)
*G01C 3/08* (2006.01)

(52) U.S. Cl.
CPC .......... *G02B 27/0179* (2013.01); *G01C 3/08* (2013.01); *G02B 27/0172* (2013.01);
(Continued)

(58) Field of Classification Search
CPC ............... G02C 11/10; G02B 27/0179; G02B 27/0172; G02B 27/0176; G02B 27/017;
(Continued)

(56) References Cited

U.S. PATENT DOCUMENTS

| 4,654,631 A * | 3/1987 | Kurcbart ................ G08B 5/225 |
| | | 24/3.12 |
| 7,029,114 B2 | 4/2006 | Smith |

(Continued)

FOREIGN PATENT DOCUMENTS

| AU | 2011220382 A1 * | 10/2012 | ........... H04N 23/635 |
| CA | 3084546 A1 * | 6/2019 | ......... G02B 27/0172 |

(Continued)

OTHER PUBLICATIONS

Korean Office Action dated Jan. 7, 2025, issued in Korean Application No. 10-2020-0026771.

*Primary Examiner* — Tarifur R Chowdhury
(74) *Attorney, Agent, or Firm* — Jefferson IP Law, LLP

(57) ABSTRACT

A wearable electronic device is provided. The wearable electronic device includes a first assembly including a frame that is mountable on the head, and a transparent display which is positioned on the frame so as to face the eyes when the frame is mounted on the head and which displays an image in a designated mode, and a second assembly including a holder that is attachable to/detachable from the frame, a lens which is positioned in the holder and which faces the transparent display when the holder is attached to the frame, and a flexible member which surrounds at least a part of the space between the transparent display and the lens and which is positioned between the holder and the frame.

15 Claims, 14 Drawing Sheets

(52) U.S. Cl.
CPC .. *G02B 27/0176* (2013.01); *G02B 2027/0178* (2013.01); *G02B 2027/0181* (2013.01)

(58) Field of Classification Search
CPC .... G02B 2027/0181; G02B 2027/0178; G02B 27/0101; G02B 2027/0132; G02B 2027/0138; G01C 3/08; H05K 7/20963; G06F 1/163; G06T 19/006
USPC ............................. 351/47, 57; 345/8; 359/630
See application file for complete search history.

(56) References Cited

U.S. PATENT DOCUMENTS

| | | | |
|---|---|---|---|
| 11,864,364 B2* | 1/2024 | Jung | H05K 7/20963 |
| 2009/0190087 A1 | 7/2009 | Hsu | |
| 2011/0258759 A1* | 10/2011 | Renaud-Goud | A61F 9/028 2/428 |
| 2011/0261314 A1 | 10/2011 | Park | |
| 2014/0218269 A1 | 8/2014 | Cazalet et al. | |
| 2017/0038798 A1* | 2/2017 | Lee | H04M 1/0268 |
| 2018/0288333 A1* | 10/2018 | VanBlon | H04N 5/76 |
| 2019/0187490 A1 | 6/2019 | Dominguez et al. | |
| 2020/0033560 A1 | 1/2020 | Weber et al. | |
| 2022/0179215 A1* | 6/2022 | Jeon | G02B 3/00 |
| 2022/0210922 A1* | 6/2022 | Uhm | H05K 1/148 |
| 2022/0260832 A1* | 8/2022 | Yang | G02B 27/0172 |
| 2023/0185098 A1* | 6/2023 | Wang | G02B 27/0176 345/8 |

FOREIGN PATENT DOCUMENTS

| | | | |
|---|---|---|---|
| CN | 107643597 A | | 1/2018 |
| CN | 222899138 U | * | 5/2025 |
| EP | 2105252 A1 | * | 9/2009 |
| KR | 10-2004-0073509 A | | 8/2004 |
| KR | 10-2009-0122857 A | | 12/2009 |
| KR | 10-2011-0118456 A | | 10/2011 |
| KR | 10-2012-0085363 A | | 8/2012 |
| KR | 10-2015-0118979 A | | 10/2015 |
| KR | 10-2016-0121186 A | | 10/2016 |
| KR | 10-2071804 B1 | | 3/2020 |
| WO | 2019/126331 A1 | | 6/2019 |
| WO | 2020/027873 A1 | | 2/2020 |

* cited by examiner

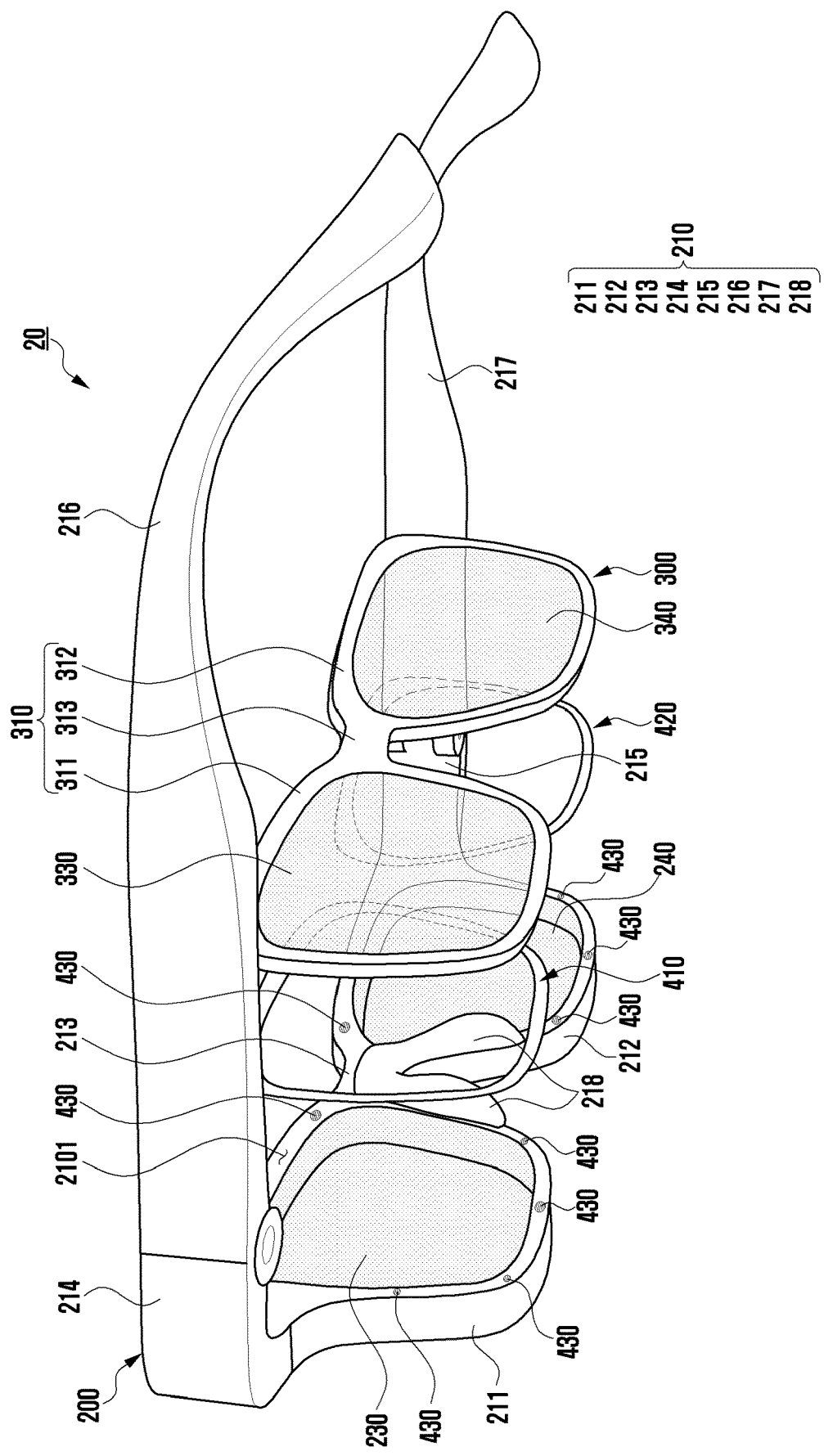

WEARABLE ELECTRONIC DEVICE FOR PROVIDING VIRTUAL IMAGE

CROSS-REFERENCE TO RELATED APPLICATION(S)

This application is a continuation application, claiming priority under § 365(c), of an International application No. PCT/KR2021/001824, filed on Feb. 10, 2021, which is based on and claims the benefit of a Korean patent application number 10-2020-0026771, filed on Mar. 3, 2020, in the Korean Intellectual Property Office, the disclosure of which is incorporated by reference herein in its entirety.

BACKGROUND

1. Field

The disclosure relates to a wearable electronic device configured to provide virtual images. More particularly, the disclosure relates to a wearable electronic device configured to provide virtual images such that a user who needs a lens (for example, eyeglass lens or corrective lens) is less uncomfortable when wearing the same and has reduced visual discomfort.

2. Description of Related Art

In line with development of digital technologies, electronic devices have been provided in various types, such as a smartphone, a tablet personal computer, or a personal digital assistant (PDA). Electronic devices have recently been developed as wearable electronic devices in various types such that portability and user accessibility can be improved. An example of such wearable electronic devices is smart glasses. The smart glasses may be wearable computer glasses configured to provide augmented reality (AR) such that visual information (for example, virtual image) is added to what a wearer actually sees (for example, an actual image), or the visual information is added together with what the wearer sees.

The above information is presented as background information only to assist with an understanding of the disclosure. No determination has been made, and no assertion is made, as to whether any of the above might be applicable as prior art with regard to the disclosure.

SUMMARY

A wearable electronic device configured to provide AR, such as smart glasses, may include a transparent display positioned in front of the wearer's eyes, for example. An image (for example, virtual image) appearing in the transparent display may appear to the wearer superimposed on the foreground (for example, actual image) in front of his/her eyes through the transparent display. However, in the case of an eyeglass wearer, it may be inconvenient to wear wearable electronic device, such as smart glasses. A lens holder may be provided, but foreign materials (for example, water or dust) may infiltrate between the lenses and the transparent display, thereby visually inconveniencing the wearer. In addition, if the inter pupillary distance (IPD) of the wearer is not considered when displaying images through the transparent display, visual discomforts (for example, blurred vision, dizziness) may occur.

Aspects of the disclosure are to address at least the above-mentioned problems and/or disadvantages and to provide at least the advantages described below. Accordingly, an aspect of the disclosure is to provide a wearable electronic device configured to provide virtual images such that a user who needs a lens (for example, eyeglass lens or corrective lens) is less uncomfortable when wearing the same and has reduced visual discomfort.

Additional aspects will be set forth in part in the description which follows and, in part, will be apparent from the description, or may be learned by practice of the presented embodiments.

In accordance with an aspect of the disclosure, a wearable electronic device is provided. The wearable electronic device includes a first assembly including a frame mountable on a head, and a transparent display which is positioned on the frame to face an eye when the frame is mounted on a head and on which an image is displayed in a designated mode, and a second assembly including a holder attachable to or detachable from the frame, a lens which is positioned in the holder and faces the transparent display when the holder is attached to the frame, and a flexible member which surrounds at least a part of a space between the transparent display and the lens and is positioned between the holder and the frame.

In accordance with another aspect of the disclosure, a wearable electronic device is provided. The wearable electronic device includes a first assembly including a frame mountable on a head, a transparent display which is positioned on the frame to face an eye when the frame is mounted on a head and on which an image is displayed in a designated mode, a processor, and a memory electrically connected to the processor and storing image data, and a second assembly including a holder attachable to or detachable from the frame, a lens which is positioned in the holder and faces the transparent display when the holder is attached to the frame, and a flexible member which surrounds at least a part of a space between the transparent display and the lens and is positioned between the holder and the frame, wherein the memory is configured to store instructions which, when being executed, cause the processor to, when the holder is attached to the frame, obtain an inter-pupillary distance (IPD) for the lens and display the image on the transparent display, based on the IPD.

A wearable electronic device configured to provide virtual images according to an embodiment of the disclosure may improve AR-related usability because a user who needs a lens is less uncomfortable when wearing the same and has reduced visual discomfort.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 2 and 3 are perspective views of a wearable electronic device for providing a virtual image according to various embodiments of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
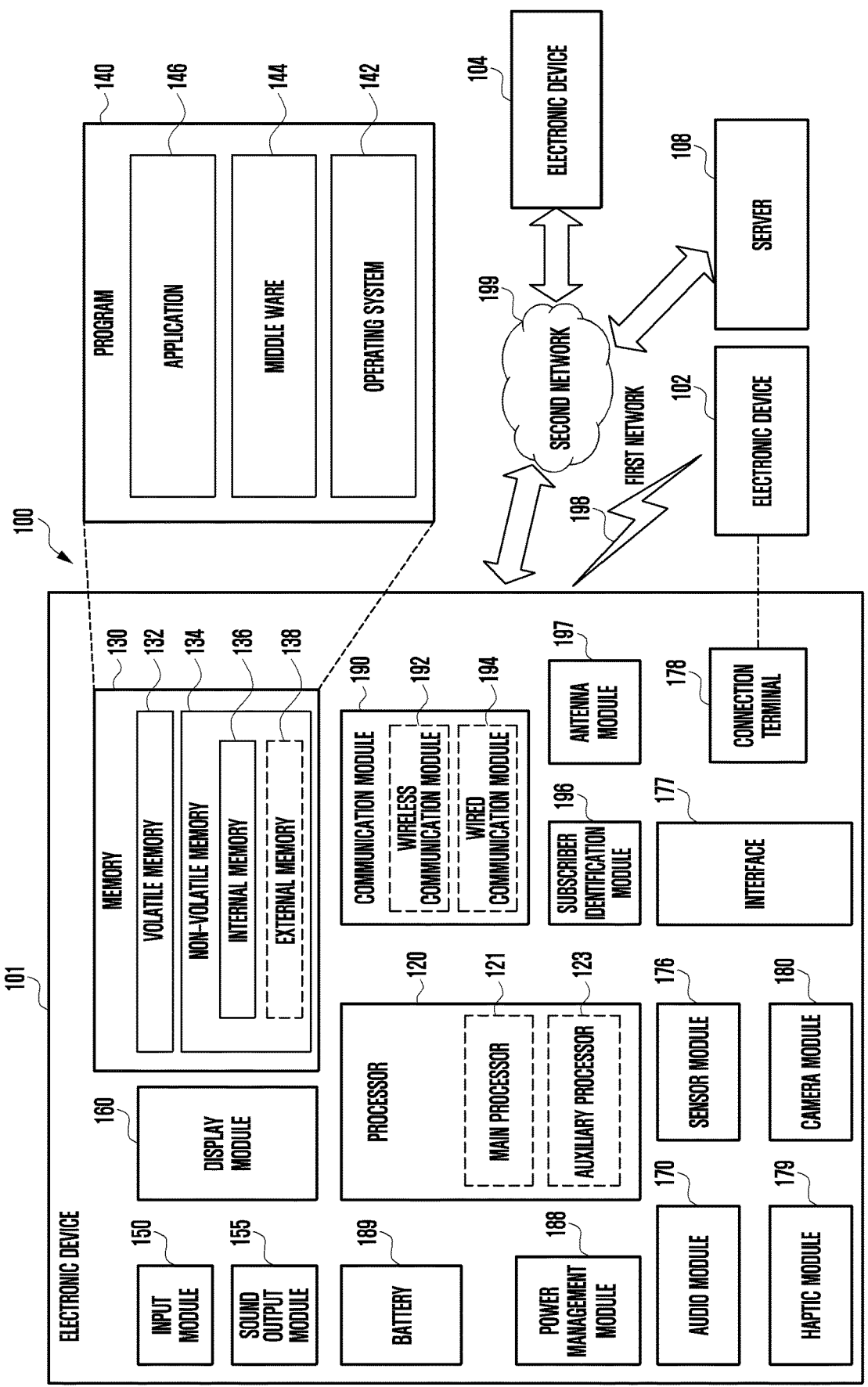
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an external electronic device 102) (e.g., speak or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, an illuminance sensor, a touch screen panel (TSP) hover sensor, or an ultrasonic sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented, for example, as at least part of a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to some embodiments of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
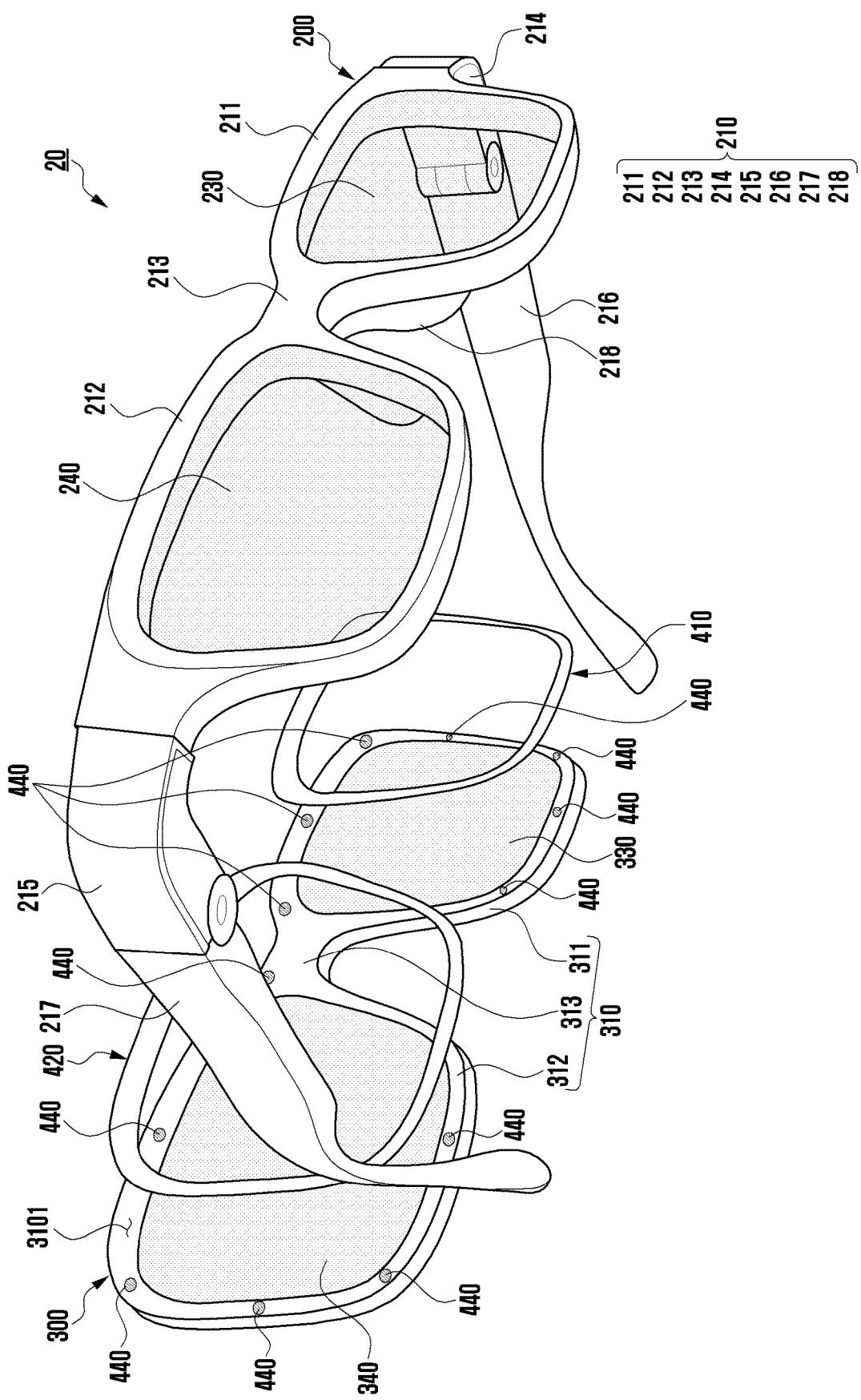

FIGS. 2 and 3 are perspective views of a wearable electronic device 20 for providing a virtual image according to various embodiments of the disclosure.

Referring to FIGS. 2 and 3, in an embodiment of the disclosure, a wearable electronic device 20 may include a first assembly 200 and a second assembly 300 attachable to or detachable from the first assembly 200.

According to an embodiment of the disclosure, the first assembly 200 may be an eyeglasses type and for example, may include a frame 210, a first transparent display 230, and a second transparent display 240. The frame 210, when mounted on the head of a user, may support the first transparent display 230 and the second transparent display 240 to be positioned in front of the eyes.

For example, the frame 210 may include a first rim 211, a second rim 212, a bridge 213, a first end piece 214, a second end piece 215, a first temple 216, a second temple 217, or a nose pad 218. The first rim 211 may surround and support at least a part of the first transparent display 230. The second rim 212 may surround and support at least a part of the second transparent display 240. The bridge 213 may connect the first rim 211 and the second rim 212 and may be placed on the nose of a user. The first end piece 214 may connect the first rim 211 and the first temple 216. The second end piece 215 may connect the second rim 212 and the second temple 217. The first temple 216 may be a portion connected to the first end piece 214 through a hinge so as to be foldable, and the end portion thereof, which is positioned behind a left ear, may be formed in a bent shape to be placed on the left ear. The second temple 217 may be a portion connected to the second end piece 215 through a hinge so as to be foldable, and the end portion thereof, which is positioned behind a right ear, may be formed in a bent shape to be placed on the right ear. The nose pad 218 may be a portion placed on a nose to support the frame 210. When the frame 210 is mounted on the head of a user, the first transparent display 230 may be positioned in front of the left eye of a wearer, and the second transparent display 240 may be positioned in front of the right eye of the wearer. The wearer may see the foreground (e.g., an actual image) of the eyes through the first transparent display 230 and the second transparent display 240.

According to various embodiments (not shown), the frame 210 may be implemented in various other shapes which allow the frame to be mounted on the head of a user while positioning the first transparent display 230 and the second transparent display 240 in front of the eyes thereof. The first assembly 200 may include various electronic components positioned or accommodated in the frame 210, and according to some embodiments of the disclosure, the frame 210 may be referred to as a 'housing'.

According to various embodiments of the disclosure, the frame 210 may be formed of a material, such as plastic for wearability, but without being limited thereto, may be formed of various other materials, such as metal based on strength or appearance.

According to various embodiments (not shown) of the disclosure, the first assembly 200 is not limited to the embodiment of FIG. 2 or 3, and may be implemented as various other shapes which allow the first assembly to be mounted on the head of a user while positioning the first transparent display 230 and the second transparent display 240 in front of the eyes thereof. For example, the first assembly 200 may include various other structures, such as straps or helmets to be implemented so as to be mounted on a head.

According to an embodiment of the disclosure, the first assembly 200 may be smartglasses (or smart glasses). For example, the first assembly 200 may be wearable computer glasses that provide augmented reality adding visual information to what a wearer really sees or adding the visual information alongside what a wearer really sees. Augmented reality (AR) can blend digital objects with the physical world. Augmented reality can provide various image information by superimposing a virtual image on a real space or thing. For example, in a mode of augmented reality, the first assembly 200 may cause an image (e.g., a virtual image) to be displayed on the first transparent display 230 and/or the second transparent display 240, and may enable a wearer to see the image superimposed on the foreground (e.g., an actual image) of the eyes. According to some embodiments of the disclosure, augmented reality may be referred to as a see-through function or a see-through mode. In order to provide an AR, an operation of superimposing visual information onto a field of view of a wearer may be variously implemented according to the types of the first transparent display 230 and/or the second transparent display 240.

According to an embodiment of the disclosure, the first transparent display 230 and/or the second transparent display 240 may be a projection-type transparent display. For example, the first transparent display 230 may be a transparent plate (or a transparent screen) to form a reflective surface, and an image generated in the first assembly 200 may be reflected from the reflective surface and then may enter the eyes (e.g., a prototype). The second transparent display 240 may be implemented in substantially the same method as the first transparent display 230.

For example, the first assembly 200 may include a first projector (not shown) for projecting light of an image to the first transparent display 230. The first transparent display 230 may be implemented as a transparent plate (or a transparent screen) on which an image projected from the first projector is displayed while the foreground of the eyes is displayed. For example, the first assembly 200 may include a second projector (not shown) for projecting light of an image to the second transparent display 240. The second transparent display 240 may be implemented as a transparent plate (or a transparent screen) on which an image projected from the second projector is displayed while the foreground of the eyes is displayed. The first projector may be positioned in the first rim 211 or the first end piece 214. The second projector may be positioned in the second rim 212 or the second end piece 215. According to various embodiments of the disclosure, the first projector or the second projector may be positioned in various positions according to a shape of the first assembly 200.

According to various embodiments of the disclosure, the first transparent display 230 and/or the second transparent display 240 may be a see-through-type transparent display. For example, the see-through-type transparent display may be a transparent organic light emitting diode (OLED) display or a transparent liquid crystal display (LCD). For another example, the see-through-type transparent display may be implemented in a transparent thin-film electroluminescence (TEEL) type. The transparent TEEL type may include a transparent insulating film between a transparent electrode and a transparent inorganic fluorescent substance by using a principle in which electrons quickly flow in a transparent inorganic fluorescent substance while emitting light. For another example, the see-through-type transparent display may be a transparent display based on an element, such as an electroluminescent display (ELD), an electrochromic element, or an electrowetting element. In addition, the see-through-type transparent display may be implemented in various other types.

According to various embodiments of the disclosure, the first transparent display 230 and/or the second transparent display 240 may be a transparent near-eye-display (NED). According to various embodiments of the disclosure, the first transparent display 230 and/or the second transparent display 240 may be implemented as an optical screen which allows a projected image to be clearly seen even in a bright environment.

According to various embodiments of the disclosure, the first transparent display 230 and/or the second transparent display 240 may be implemented in various types capable of displaying or including an augmented reality (AR) overlay.

According to some embodiments (not shown) of the disclosure, the first assembly 200 may be implemented in a form of directly illuminating an image on the retina. For example, the first assembly 200 may include a first projector for directly projecting light to the retina of a left eye, and in this case, the first transparent display 230 may be omitted. According to some embodiments of the disclosure, replacing the first transparent display 230, a transparent plate may be positioned between the first projector and the left eye so as to perform a function of transmitting light. For example, the first assembly 200 may include a second projector for directly projecting light to the retina of a right eye, and in this case, the second transparent display 240 may be omitted. According to some embodiments of the disclosure, replacing the second transparent display 240, a transparent plate may be positioned between the second projector and the right eye so as to perform a function of transmitting light.

According to some embodiments of the disclosure, the first assembly 200, as smart glasses, may be defined as wearable computer glasses that are able to change their optical properties at runtime. For example, the first assembly 200 may be implemented to change the tint of the first transparent display 230 and/or the second transparent display 240 by electronic means.

According to some embodiments (not shown) of the disclosure, the first transparent display 230 and the second transparent display 240 may be implemented as an integrated transparent display. For example, the integrated transparent display may include a first portion positioned in the first rim 211, a second portion positioned in the second rim 212, and a third portion which is positioned in the bridge 213 and connects the first portion and the second portion. In the case, the bridge 231 may be implemented in a different shape to correspond to the third portion.

According to various embodiments of the disclosure, the first assembly 200 may also be implemented to provide a see-closed function. In this case, the first transparent display 230 and the second transparent display 240 may be replaced with a display having a non-transparent form. In some cases, the wearable electronic device 20 may further include a cover attachable to or detachable from the first assembly 200 when using the see-closed function. When the cover is attached to the first assembly 200, the foreground (e.g., an actual image) through the first transparent display 230 and the second transparent display 240 may be blocked. In a see-closed function, the first assembly 200 may be configured to have two screens positioned in front of two eyes of a user, respectively, so as to allow a user to see contents (e.g., a movie, a streaming, a broadcast, or a game) provided through the two screens. A see-closed function may provide an immersion to a user by using screens in which first transparent display 230 and the second transparent display 240 are independent from each other. According to various embodiments (not shown), the first assembly 200 may include a camera, and may also provide a see-through function by using the camera. A see-through function may cause the image data obtained from the camera to be displayed on two screens. Through this, a wearer may experience an external virtual environment, and may identify a peripheral environment through an image of the camera as necessary. According to various embodiments of the disclosure, the first assembly 200 may be implemented to have one screen extending from the left eye to the right eye. In this case, the first assembly 200, in a see-closed function, may be configured to display a content through a first screen area of one screen, which is positioned in front of the left eye and a second screen area of the one screen, which is positioned in front of the right eye.

According to various embodiments of the disclosure, the first assembly 200 may be implemented to provide mixed reality (MR) (or hybrid reality). Mixed reality (MR) may include an environment in which virtual reality (VR) is grafted onto the real world such that a real physical object and a virtual object can interact with each other. Mixed reality (MR) may include a meaning of augmented reality (AR) adding virtual information, based on the reality, and augmented virtuality (AV) adding real information to a virtual environment. An MR may provide a smart environment in which reality and virtuality are naturally connected, and thus a user may have a rich experience. For example, a user may interact with a virtual pet placed on the palm of the user, or may play a game by building a virtual game environment in a real room. For another example, in an MR, a user may virtually rearrange furniture in a home, or may build an environment in which as if people away from each other work together in a state of being gathered together.

According to an embodiment of the disclosure, the second assembly 300 may be a lens assembly including a lens (e.g., an eyeglass lens, or a corrective lens) positioned between the first assembly 200 and the eyes of a wearer. For example, the second assembly 300 may include a holder (or a support member) 310, a first lens 330, or a second lens 340. When the holder 310 is attached to the frame 210, the first lens 330 positioned in the holder 310 may face the first transparent display 230. When the holder 310 is attached to the frame 210, the second lens 340 positioned in the holder 310 may face the second transparent display 240.

According to an embodiment of the disclosure, the holder 310 may be an integrated structure for disposing the first lens 330 and the second lens 340. For example, the holder 310 may include a first portion 311 to which the first lens 330 is fixed, a second portion 312 to which the second lens 340 is fixed, and a third portion 313 for connecting the first portion 311 and a second portion 312. The first portion 311 may be a shape extending along the first rim 211 of the frame 210, and may surround and support at least a part of the first lens 330. The second portion 312 may be a shape extending along the second rim 212 of the frame 210, and may surround and support at least a part of the second lens 340.

For example, the first lens 330 may be manufactured to be fitted into the first portion 311, based on eyesight of the left eye of a user. The second lens 340 may be manufactured to be fitted into the second portion 312, based on eyesight of the right eye of a user. In addition, the first lens 330 and the second lens 340, which are positioned in the holder 310, may be manufactured based on an inter-pupillary distance (IPD) (e.g., a distance of a line connecting the centers of the pupils of both eyes). The first lens 330, which is disposed in the first portion 311, may be manufactured such that an optical center point (e.g., a position through which light passes without being bent) is aligned with the pupil center of a left eye. The second lens 340, which is disposed in the second portion 312, may be manufactured such that an optical center point is aligned with the pupil center of a right eye. The distance between the optical center point of the first lens 330 and the optical center point of the second lens 340 may be equal to the IPD. Therefore, visual discomfort of a wearer, such as blurriness or a dizziness, can be prevented.

According to an embodiment of the disclosure, the wearable electronic device 20 may include a first flexible member 410 and/or a second flexible member 420 positioned between the first assembly 200 and the second assembly 300. The first flexible member 410 may surround at least a part of a first space between the first transparent display 230 and the first lens 330, and may be elastically positioned between the frame 210 of the first assembly 200 and the holder 310 of the second assembly 300. A seal structure, which is implemented by the frame 210, the holder 310, and the first flexible member 410, may prevent foreign materials, such as water or dust from being introduced into the first space so as to prevent visual discomfort of a wearer. The second flexible member 420 may surround at least a part of a second space between the second transparent display 240 and the second lens 340, and may be elastically positioned between the frame 210 of the first assembly 200 and the holder 310 of the second assembly 300. A seal structure, which is implemented by the frame 210, the holder 310, and the second flexible member 420, may prevent foreign materials, such as water or dust from being introduced into the second space so as to prevent visual discomfort of a wearer. The first flexible member 410 and/or the second flexible member 420 may be formed of various elastic materials, such as rubber. According to various embodiments of the disclosure, the first flexible member 410 and the second flexible member 420 may be formed as an integrated flexible member.

According to various embodiments of the disclosure, when the first transparent display 230 is implemented as a projection-type transparent display, a first projector (not shown), which projects light to the first transparent display 230, may be at least partially positioned in the first space formed between the first transparent display 230 and the first lens 330 and surrounded by the first flexible member 410. A seal structure, which is implemented by the frame 210, the holder 310, and the first flexible member 410, may protect the first projector from foreign materials, such as water or dust. For example, the seal structure may prevent a portion of the first projector, which emits light, from being contaminated by foreign materials, such as water or dust, so as to prevent the quality of an image projected on the first transparent display 230 from being degraded.

According to various embodiments of the disclosure, when the second transparent display 240 is implemented as a projection-type transparent display, a second projector (not shown), which projects light to the second transparent display 240, may be at least partially positioned in the second space formed between the second transparent display 240 and the second lens 340 and surrounded by the second flexible member 420. A seal structure, which is implemented by the frame 210, the holder 310, and the second flexible member 410, may protect the second projector from foreign materials, such as water or dust. For example, the seal structure may prevent a portion of the second projector, which emits light, from being contaminated by foreign materials, such as water or dust, so as to prevent the quality of an image projected on the second transparent display 240 from being degraded.

Figure 4A:
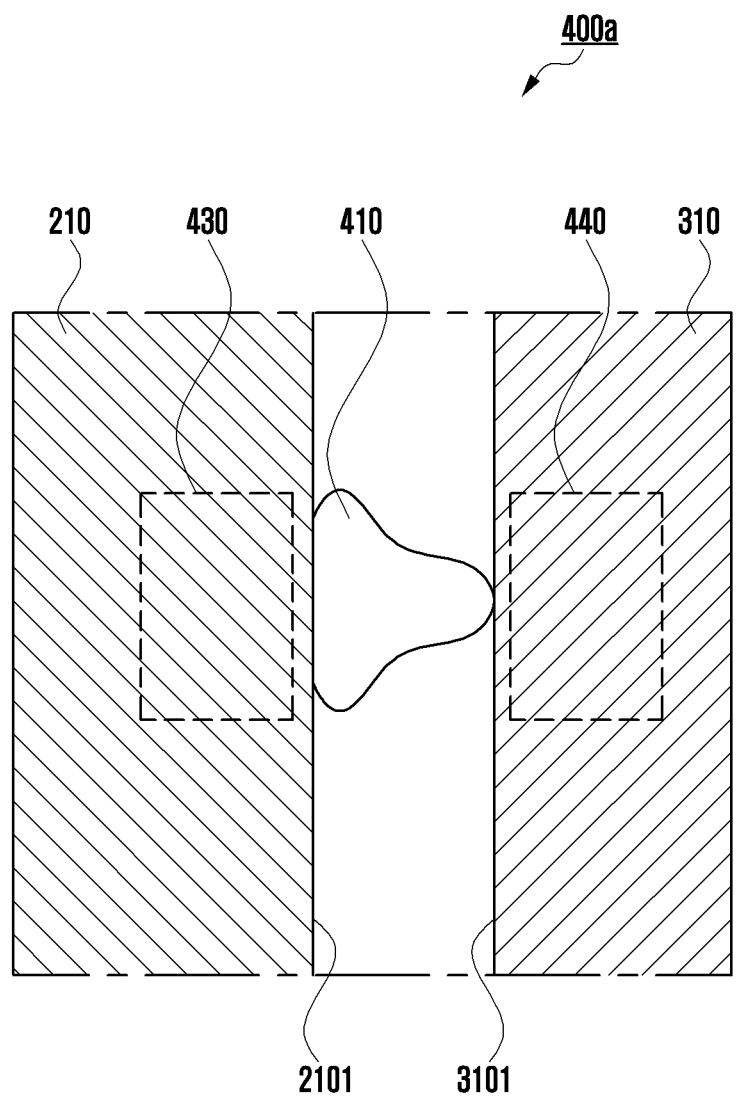
FIG. 4A is a cross-sectional view of an attachment/detachment seal structure between a first assembly and a second assembly in FIG. 2 or 3 according to an embodiment of the disclosure.

FIG. 4A is a cross-sectional view of an attachment/detachment seal structure between a first assembly and a second assembly according to an embodiment of the disclosure.

Referring to FIGS. 2, 3, and 4A, an attachment/detachment seal structure 400a according to an embodiment of the disclosure may include the frame 210 of the first assembly 200, the holder 310 of the second assembly 300, a first flexible member 410 (or a second flexible member 420), and multiple first magnetic substances 430, or multiple second magnetic substances 440.

According to an embodiment of the disclosure, the multiple first magnetic substances 430 may be positioned in the frame 210. The frame 210 may include a first surface 2101 facing the holder 310. The multiple first magnetic substances 430 may also be arranged inside the frame 210 to be close to the first surface 2101. According to some embodiments (not shown), the multiple first magnetic substances 430 may be arranged on the first surface 2101. According to various embodiments (not shown), the multiple first magnetic substances 430 may also be arranged in recesses formed on the first surface 2101.

According to an embodiment of the disclosure, the multiple second magnetic substances 440 may be positioned in the holder 310 to correspond to the multiple first magnetic substances 430. The holder 310 may include a second surface 3101 facing the first surface 2101 of the frame 210. The multiple second magnetic substances 440 may also be arranged inside the holder 310 to be close to the second surface 3101. According to some embodiments (not shown), the multiple second magnetic substances 440 may be arranged on the second surface 3101. According to some embodiments (not shown), the multiple second magnetic substances 440 may also be arranged in recesses formed on the second surface 3101. The holder 310 may be attached to the frame 210 by the attractive force between the multiple first magnetic substances 430 and the multiple second magnetic substances 440. According to an embodiment of the disclosure, the first flexible member 410 and the second flexible member 420 may be elastically arranged between the frame 210 and the holder 310 by the attractive force between the multiple first magnetic substances 430 and the multiple second magnetic substances 440. The multiple first magnetic substances 430 and the multiple second magnetic substances 440 may also function to guide a coupling position between the frame 210 of the first assembly 200 and the holder 310 of the second assembly 300 to a user. According to various embodiments of the disclosure, the number or the position of the first magnetic substances (or the second magnetic substances) may be various without being limited to the embodiment of FIG. 3.

According to an embodiment of the disclosure, the multiple first magnetic substances 430 and the multiple second magnetic substances 440 may be positioned such that the first flexible member 410 and the second flexible member 420 are interposed therebetween. According to various embodiments (not shown), in order to improve the adhesion of the first flexible member 410 and the second flexible member 420 with respect to the frame 210 and the holder 310, the multiple first magnetic substances 430 and the multiple second magnetic substances 440 may be arranged in various different positions with respect to the first flexible member 410 and second flexible member 420. According to various embodiments (not shown) of the disclosure, the multiple first magnetic substances 430 and the multiple second magnetic substances 440 may be positioned to face one another while not overlapping with the first flexible member 410 and the second flexible member 420.

According to an embodiment of the disclosure, the first flexible member 410 and/or the second flexible member 420 may be disposed on the frame 210. According to various embodiments (not shown), the second surface 3101 of the holder 310 may include recesses into which the first flexible member 410 and the second flexible member 420 can be partially inserted. The recesses may improve the adhesion of the first flexible member 410 and the second flexible member 420 with respect to the holder 310. The recesses may also function to guide a coupling position between the frame 210 and the holder 310 to a user.

According some embodiments of the disclosure, the first flexible member 410 and/or the second flexible member 420 may be disposed on the holder 310. According to various embodiments (not shown), the first surface 2101 of the frame 210 and/or the first surface 3101 of the holder 310 may include recesses into which the first flexible member 410 and the second flexible member 420 can be partially inserted. The recesses may improve the adhesion of the first flexible member 410 and the second flexible member 420 with respect to the frame 210. The recesses may also function to guide a coupling position between the frame 210 and the holder 310 to a user.

According to various embodiments (not shown) of the disclosure, the first surface 2101 of the frame 210 includes first recesses into which the first flexible member 410 and the second flexible member 420 can be partially inserted, and the second surface 3101 of the holder 310 may include second recesses into which the first flexible member 410 and the second flexible member 420 can be partially inserted. The first recesses and/or the second recesses may improve the adhesion of the first flexible member 410 and the second flexible member 420 with respect to the frame 210 and the holder 310. The first recesses and/or the second recesses may also function to guide a coupling position between the frame 210 and the holder 310 to a user.

According to various embodiments of the disclosure, the first flexible member 410 and/or the second flexible member 420 may be attached to the frame 210 or the holder 310 by means of an adhesive member (e.g., various adhesive materials, such as a double-sided tape).

According to various embodiments of the disclosure, multiple first flexible members 410 may be provided, and an embodiment thereof will be described with reference to FIG. 4B.

Figure 4B:
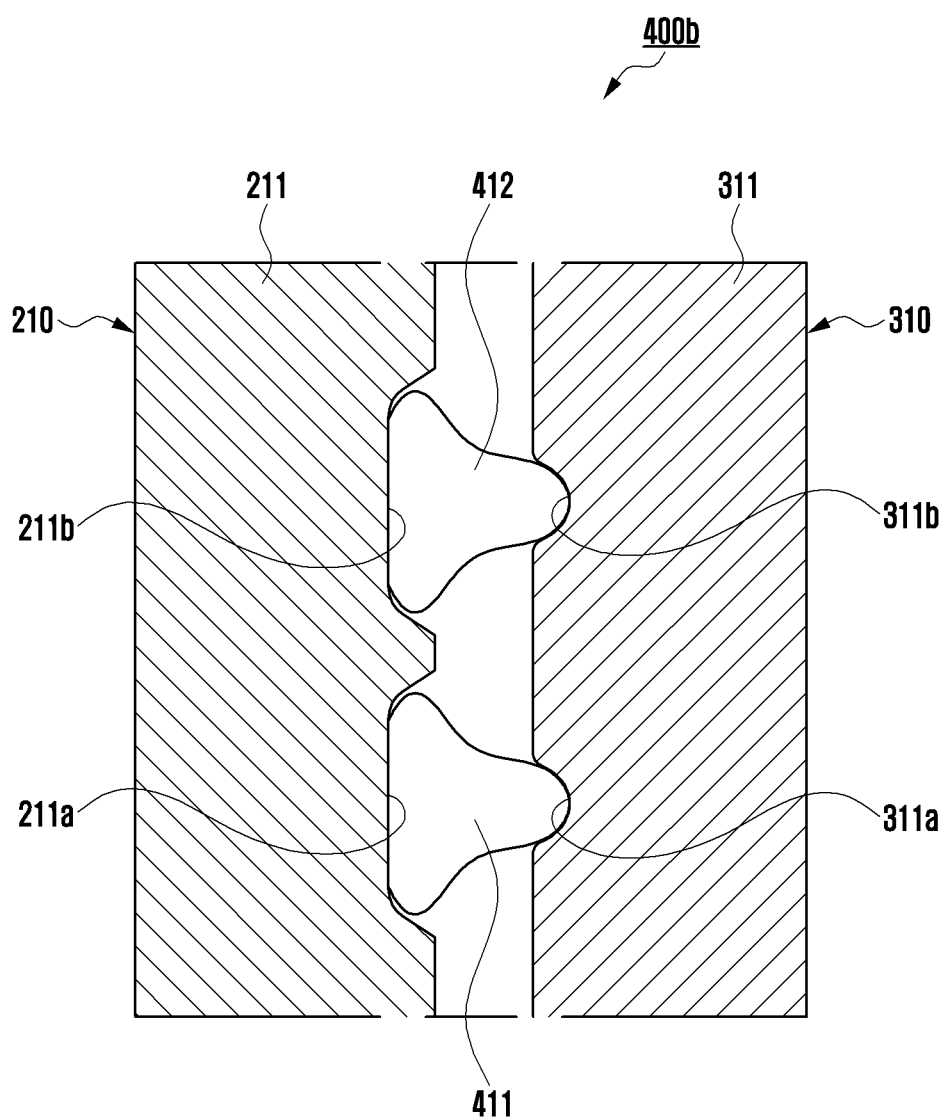
FIG. 4B is a cross-sectional view of an attachment/detachment seal structure between a first assembly and a second assembly according to an embodiment of the disclosure.

FIG. 4B is a cross-sectional view of an attachment/detachment seal structure between a first assembly and a second assembly according to an embodiment of the disclosure.

Referring to FIG. 4B, in an embodiment of the disclosure, multiple first flexible members 411 and 412 may be positioned between the first rim 211 of the frame 210 and the first portion 311 of the holder 310. The multiple first flexible members 411 and 412 may have a ring shape, and when seen in a direction from the holder 310 to the frame 210, one first flexible member 411 may be positioned inward of the other first flexible member 412. The number of the first flexible members may not be limited to the embodiment of FIG. 4B.

According to various embodiments of the disclosure, one first flexible member 411 may be positioned in one first recess 211a formed on the first rim 211, and the other first flexible member 412 may be positioned in the other first recess 211b formed on the first rim 211. According to various embodiments of the disclosure, the holder 310 may include one second recess 311a into which one first flexible member 411 can be partially inserted, or the other second recess 311b into which the other first flexible member 412 can be partially inserted.

According to various embodiments (not shown), the second flexible member 420 in FIG. 2 or 3 may also be provided in a plurality. For example, the multiple second flexible members may be positioned between the second rim 212 (see FIG. 2) of the frame 210 and the second portion 312 (see FIG. 2) of the holder, and may be implemented as substantially the same structure as the embodiment of FIG. 4B. Although not illustrated, the holder 310 may be attached to the frame 210 by the attractive force between the multiple first magnetic substances 430 (see FIG. 3) positioned in the frame 210 and the multiple second magnetic substances 440 (see FIG. 2) positioned in the holder 310. The multiple first flexible members 411 and 412 and the multiple second flexible members may be elastically arranged between the frame 210 and the holder 310 by the attractive force between the multiple first magnetic substances 430 and the multiple second magnetic substances 440. The first recesses 211a and 211b and/or the second recesses 311a and 311b can improve the adhesion of the multiple first flexible members 411 and 412 and the multiple second flexible members with respect to the frame 210 and holder 310. The first recesses 211a and 211b and/or the second recesses 311a and 311b may also function to guide a coupling position between the frame 210 and the holder 310 to a user.

Figure 4C:
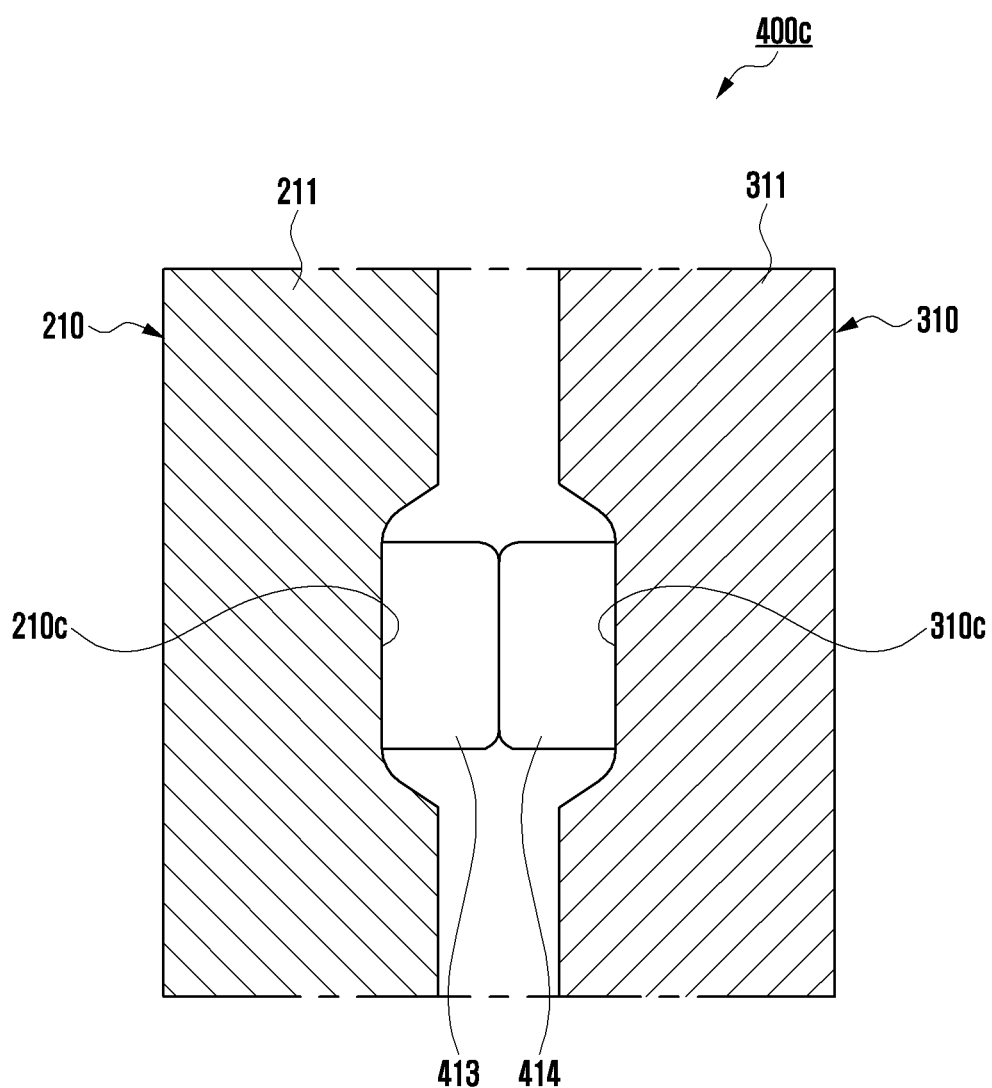
FIG. 4C is a cross-sectional view of an attachment/detachment seal structure between a first assembly and a second assembly according to an embodiment of the disclosure.

FIG. 4C is a cross-sectional view of an attachment/detachment seal structure between a first assembly and a second assembly according to an embodiment of the disclosure.

Referring to FIG. 4C, in an embodiment of the disclosure, multiple first flexible members 413 and 414 may be positioned to face each other between the first rim 211 of the frame 210 and the first portion 311 of the holder 310. One first flexible member 413 may be positioned in a first recess 210c formed on the first rim 211 of the frame 210. The other first flexible member 414 may be positioned in a second recess 310c formed on the first portion 311 of the holder 310. The first recess 210c and the second recess 310c may be positioned to face each other.

According to various embodiments (not shown), the second flexible member 420 in FIG. 2 or 3 may also be provided in a plurality. For example, the multiple second flexible members may be positioned between the second rim 212 (see FIG. 2) of the frame 210 and the second portion 312 (see FIG. 2) of the holder, and may be implemented as substantially the same structure as the embodiment of FIG. 4C. Although not illustrated, the holder 310 may be attached to the frame 210 by the attractive force between the multiple first magnetic substances 430 (see FIG. 3) positioned in the frame 210 and the multiple second magnetic substances 440 (see FIG. 2) positioned in the holder 310. The multiple first flexible members 413 and 414 and the multiple second flexible members may be elastically arranged between the frame 210 and the holder 310 by the attractive force between the multiple first magnetic substances 430 and the multiple second magnetic substances 440. According to an embodiment (not shown), the multiple first magnetic substances 430 (see FIG. 3) and the multiple second magnetic substances 440 (see FIG. 2) may be positioned to face one another while overlapping with the multiple first flexible members 413 and 414 and the multiple second flexible members. According to another embodiment (not shown), the multiple first magnetic substances 430 and the multiple second magnetic substances 440 may also be positioned to face one another while not overlapping with the multiple first flexible members 413 and 414 and the multiple second flexible members.

Figure 4D:
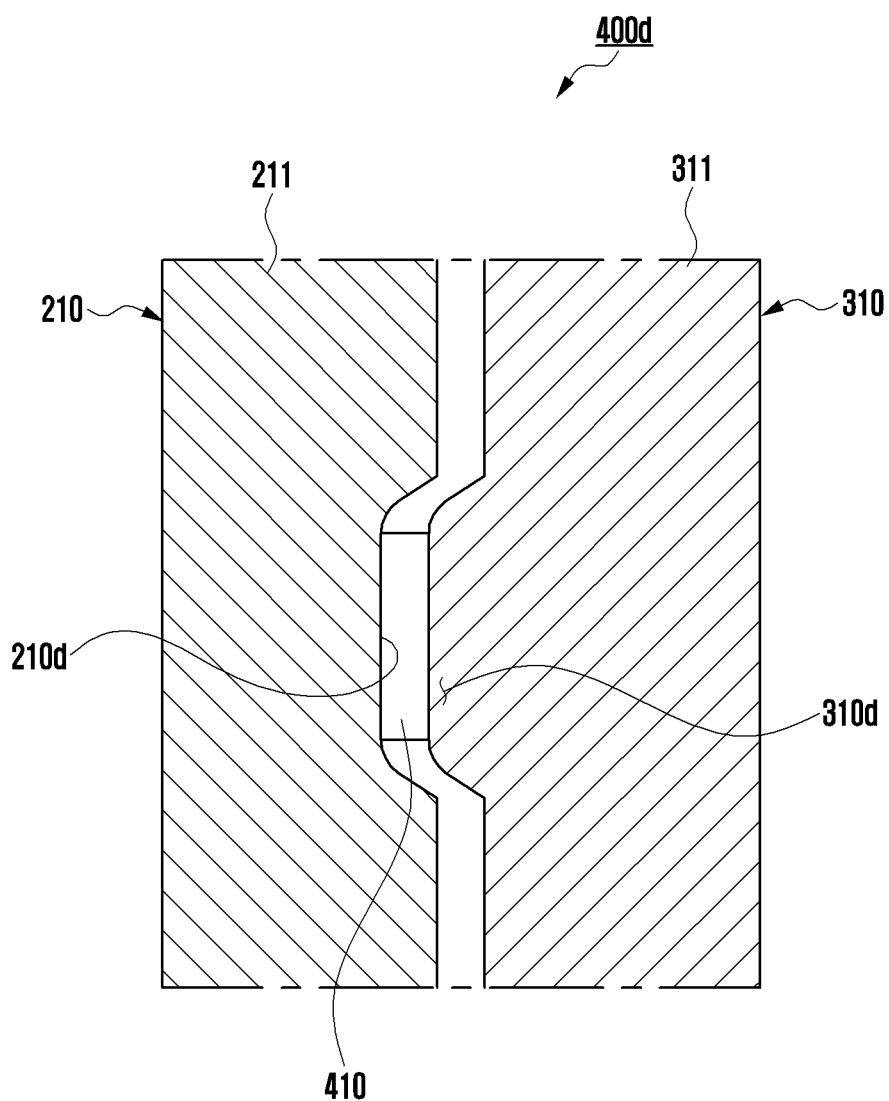
FIG. 4D is a cross-sectional view of an attachment/detachment seal structure between a first assembly and a second assembly according to an embodiment of the disclosure.

FIG. 4D is a cross-sectional view of an attachment/detachment seal structure between a first assembly and a second assembly according to an embodiment of the disclosure.

Referring to FIG. 4D, in an embodiment of the disclosure, the first rim 211 of the frame 210 may include a recess 210d formed to face the first portion 311 of the holder 310. The holder 310 may include a protrusion 310d formed to face the recess 210d of the frame 210. The protrusion 310d may have a shape capable of being partially inserted into the recess 210d. The first flexible member 410 may be positioned between the recess 210d and the protrusion 310d. By the attractive force between the multiple first magnetic substances 430 (see FIG. 3) positioned in the frame 210 and the multiple second magnetic substances 440 (see FIG. 2) positioned in the holder 310, the first flexible member 410 may be elastically disposed between the first rim 211 of the frame 210 and the first portion 311 of the holder 310, and the protrusion 310d may be partially inserted into the recess 210d. According to some embodiments (not shown) of the disclosure, a recess may also be formed on the first portion 311 of the holder 310, and the protrusion may also be formed on the first rim 211 of the frame 210.

According to an embodiment of the disclosure, the first flexible member 410 may be attached to the frame 210. According to another embodiment of the disclosure, the first flexible member 410 may be attached to the holder 310.

According to various embodiments (not shown) of the disclosure, the second flexible member 420 in FIG. 2 or 3 may be substantially the same structure as the embodiment of FIG. 4D, and may be elastically disposed between the second rim 212 (see FIG. 2) of the frame 210 and the second portion 312 (see FIG. 2) of the holder 310. According to an embodiment (not shown), the multiple first magnetic substances 430 (see FIG. 3) and the multiple second magnetic substances 440 (see FIG. 2) may be positioned to face one another while overlapping with first flexible member 410 and the second flexible member 420. According to various embodiments (not shown), the multiple first magnetic substances 430 and the multiple second magnetic substances 440 may be positioned to face one another while not overlapping with the first flexible member 410 and the second flexible member 420.

According to an embodiment of the disclosure, the embodiments of FIG. 4B, 4C, or 4D may include a structure including recesses between the frame 210 and the holder 310, so as to contribute to a slimmed coupling structure between the frame 210 and the holder 310.

According to various embodiments of the disclosure, the attachment/detachment seal structure is not limited to the types of using the attractive force between magnetic substances according to an embodiment of FIG. 4A, 4B, 4C, or 4D, and may be implemented in various types in which the frame 210 and the holder 310 are attachable and detachable with the first flexible member 410 and the second flexible member 420 interposed therebetween. For example, an attachment/detachment seal structure based on a hook joint may be provided between the frame 210 and the holder 310.

According to an embodiment of the disclosure, when the second assembly 300 is attached to the first assembly 200, the first assembly 200 may obtain the IPD, based on the second assembly 300, and may be configured such that an image is displayed on the first transparent display 230 and/or the second transparent display 240, based on the IPD. Therefore, visual discomfort of a wearer, such as blurriness or a dizziness, can be prevented.

Figure 5:
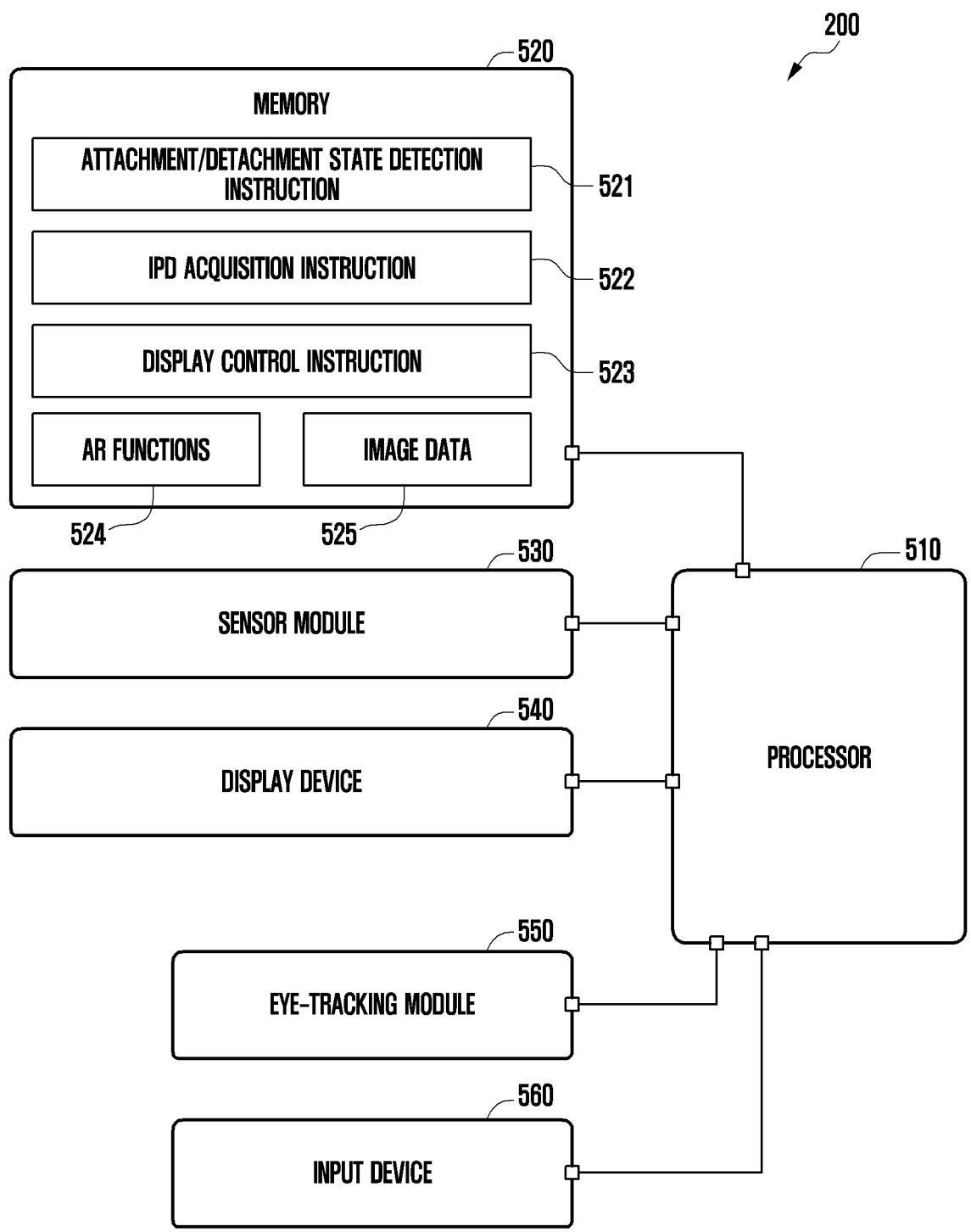
FIG. 5 is a block diagram of a first assembly in FIG. 2 or 3 according to an embodiment of the disclosure.

FIG. 5 is a block diagram of a first assembly according to an embodiment of the disclosure.

Referring to FIG. 5, in an embodiment of the disclosure, the first assembly 200 may include a processor 510, a memory 520, a sensor module 530, a display device 540, an eye-tracking module 550, or an input device 560. According to various embodiments of the disclosure, the first assembly 200 may be the electronic device 101 in FIG. 1, or may be implemented by including at least some of the elements of the electronic device 101 in FIG. 1 or by additionally including other elements in addition thereto. According to some embodiments of the disclosure, the first assembly 200 may be implemented by omitting some of the elements of the electronic device 101 in FIG. 1.

For example, the processor 510 (e.g., the processor 120 in FIG. 1) may include a micro controller unit (MCU), and may drive an operating system (OS) or an embedded software program to control multiple hardware elements connected to the processor 510. For example, the processor 510 may control multiple hardware elements according to instructions (e.g., the program 140 in FIG. 1) stored in the memory 520.

For example, the display device 540 (e.g., the display device 160 in FIG. 1) may visually provide information to the outside (e.g., a user). The display device 540 may be variously implemented, such as a display, a hologram device, or a projector. The display device 540 may further include at least one control circuit for controlling at least one element included therein. According to an embodiment of the disclosure, the display device 540 may include the first transparent display 230 and/or the second transparent display 240 in FIG. 2 or 3.

For example, the sensor module 530 (e.g., the sensor module 176 in FIG. 1) may measure a physical quantity or detect an operation state of the first assembly 200, and then may convert the measured or the detected information into an electrical signal. For example, the sensor module 530 may include at least one of an acceleration sensor, a gyro sensor, a geomagnetic sensor, a magnetic sensor, a proximity sensor, a gesture sensor, a grip sensor, a biometric sensor, and a pressure sensor. According to an embodiment of the disclosure, whether the second assembly 300 (see FIG. 2 or 3) is attached may be detected using at least one sensor (e.g., a magnetic sensor, a proximity sensor, or a pressure sensor) of the sensor module 530. According to various embodiments of the disclosure, whether the first assembly 200 is worn may be detected using at least one sensor (e.g., a proximity sensor, a grip sensor, or a pressure sensor) of the sensor module 530. According to various embodiments of the disclosure, a movement of a head, on which the first assembly 200 is worn, may be detected using at least one sensor (e.g., an acceleration sensor, a gyro sensor, or a geomagnetic sensor) of the sensor module 530. A gesture sensor may detect a movement of the hand or the finger of a user as an input operation with respect to the first assembly 200. According to some embodiments of the disclosure, the sensor module 530 may recognize biometric information of a user by using various biometric sensors (or biometric recognition sensors), such as an e-nose sensor, an electromyography (EMG) sensor, an electroencephalogram (EEG) sensor, an electrocardiogram (ECG) sensor, or an iris sensor. According to various embodiments of the disclosure, the sensor module 530 may further include at least one control circuit for controlling at least one sensor belonging therein.

For example, the eye-tracking module 550 may track the gaze of a user. For example, the eye-tracking module 550 may track the gaze of a user by using at least one type of an electro-oculography (EOG) (or an electrooculogram) sensor, a coil system, a dual Purkinje system, bright pupil systems, or dark pupil systems. According to various embodiments of the disclosure, the eye-tracking module 550 may further include a camera (e.g., a micro-camera) for eye tracking.

For example, the input device 560 (e.g., the input device 150 in FIG. 1) may receive user input. For example, the input device 560 may include a touch pad or a button. For example, the touch pad may recognize touch input through at least one type of an electrostatic type, a pressure sensitive type, an infrared type, or an ultrasonic type. According to various embodiments of the disclosure, the touch pad may further include a control circuit. An electrostatic touch pad may be capable of physical contact or proximity recognition. The touch pad may further include a tactile layer, and may provide a tactile reaction to a user. For example, a button may include a physical button, an optical key, or a keypad. In addition, the input device 560 may include other various types of user interfaces.

According to an embodiment of the disclosure, the memory 520 (e.g., the memory 130 in FIG. 1) may store an attachment/detachment state detection instruction 521, an IPD acquisition instruction 522, a display control instruction 523, AR functions 524, or image data 525.

According to an embodiment of the disclosure, the attachment/detachment state detection instruction 521 may include instructions for causing the processor 510 to identify the attachment state of the second assembly 300 (see FIG. 2 or 3) by using the sensor module 530.

For example, when the second assembly 300 (see FIG. 2 or 3) is in a state of being attached to the first assembly 200, a magnetic sensor (e.g., a Hall integrated circuit (IC)) of the sensor module 530 may detect at least one magnetic substance (e.g., at least one of the multiple second magnetic substances 440 in FIG. 3) disposed in the second assembly 300 to deliver an electrical signal related thereto to the processor 510. The processor 510 may identify the attachment state of the second assembly 300, based on an electrical signal obtained from the magnetic sensor.

For another example, when the second assembly 300 (see FIG. 2 or 3) is in a state of being attached to the first assembly 200, a proximity sensor of the sensor module 530 may deliver an electrical signal for the proximity of the second assembly 300 to the processor 510. The processor 510 may identify the attachment state of the second assembly 300, based on an electrical signal obtained from the proximity sensor.

For another example, when the second assembly 300 (see FIG. 2 or 3) is in a state of being attached to the first assembly 200, a pressure sensor of the sensor module 530 may deliver an electrical signal for a pressure between first assembly 200 and the second assembly 300 to the processor 510. The processor 510 may identify the attachment state of the second assembly 300, based on an electrical signal obtained from the pressure sensor. According to various embodiments of the disclosure, other various sensors may be utilized, and thus the attachment state of the second assembly 300 may be identified.

According to some embodiments of the disclosure, the first assembly 200 may include a first contact, and the second assembly 300 (see FIG. 2 or 3) may include a second contact. When the second assembly 300 is attached to the first assembly 200, the first contact and the second contact may be in physical contact with each other so as to be electrified. The processor 510 may identify the attachment state of the second assembly 300, based on a current flow between the first contact and the second contact.

In an embodiment of the disclosure, referring to FIGS. 2 and 5, when the attachment state of the second assembly 300 is identified, the IPD acquisition instruction 522 may include instructions for causing the processor 510 to obtain the IPD applied to the first lens 330 and the second lens 340 of the second assembly 300. For example, the processor 510 may obtain the IPD, based on the second assembly 300. For example, the processor 510 may obtain the IPD of a wearer by using the eye-tracking module 550. For example, the processor 510 may obtain the IPD, based on the input of a user through the input device 560.

According to various embodiments (not shown) of the disclosure, the memory 520 may store a wearing state detection instruction. The wearing state detection instruction may include instructions for causing the processor 510 to identify whether the first assembly 200 (see FIG. 2 or 3) is worn on a user, by using at least one sensor (e.g., a proximity sensor, a grip sensor, or pressure sensor) of the sensor module 530.

According to an embodiment of the disclosure, the display control instruction 523 may include instructions for causing the processor 510 to display the image data 525 stored in the memory 520 through the display device 540, based on the obtained IPD. For example, when the AR functions 524 (e.g., the program 140 in FIG. 1, which is associated with AR functions) stored in the memory 520 is executed, the processor 510 may determine a position at which an image (e.g., a virtual image) is displayed on a screen of the display device 540, based on the obtained IPD. Therefore, visual discomfort of a wearer, such as blurriness or a dizziness, can be prevented.

According to various embodiments of the disclosure, the memory 520 may further store virtual reality (VR) functions (the program 140 in FIG. 1, which is associated with VR functions), or mixed reality (MR) functions (the program 140 in FIG. 1, which is associated with MR functions). When VR functions or MR functions stored in the memory 520 are executed, the processor 510 may determine a position at which an image (e.g., a virtual image) is displayed on a screen of the display device 540, based on the obtained IPD.

Figure 6:
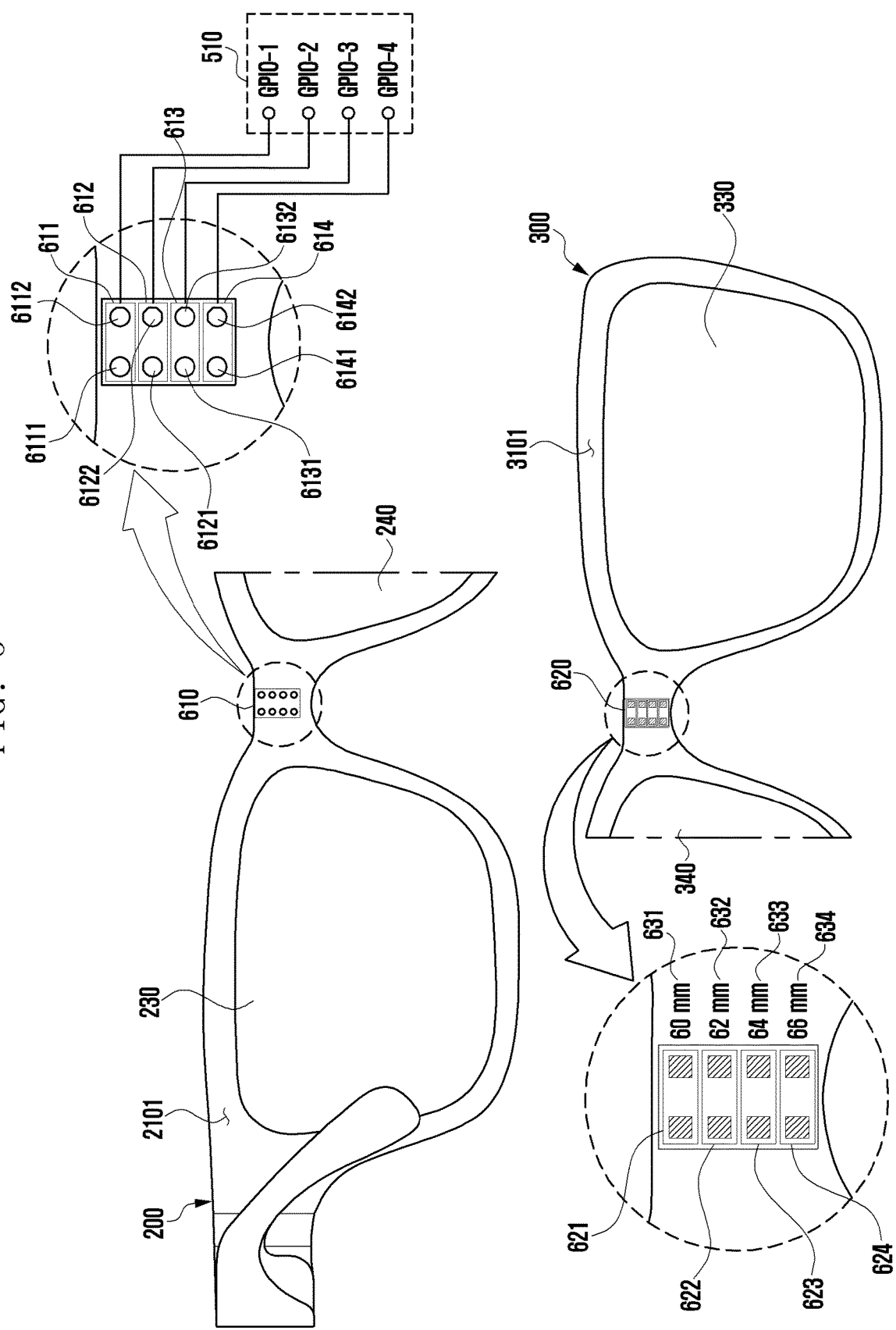
FIG. 6 is a reference view showing a manner in which a first assembly obtains an IPD according to an embodiment of the disclosure.

FIG. 6 is a reference view showing a manner in which a first assembly obtains an IPD according to an embodiment of the disclosure.

Referring to FIGS. 2 and 6, in an embodiment of the disclosure, the first assembly 200 may further include a first connector 610 (e.g., the connection terminal 178 in FIG. 1) positioned on the first surface 2101 facing the holder 310 of the second assembly 300. The second assembly 300 may further include a second connector 620 positioned on the second surface 3101 facing the frame 210 of the first assembly 200. When the second assembly 300 is attached to the first assembly 200, the processor 510 may determine the IPD applied to the first lens 330 and the second lens 340 of the second assembly 300, based on the position of a current flow between the first connector 610 and the second connector 620. For example, the first connector 610 may include a first terminal part 611 corresponding to a first value or a first range, a second terminal part 612 corresponding to a second value or a second range, a third terminal part 613 corresponding to a third value or a third range, or a fourth terminal part 614 corresponding to a fourth value or a fourth range. The first value, the second value, the third value, and the fourth value may be different from one another. The first range, the second range, the third range, and the fourth range may be different from one another. The second connector 620 may include a first corresponding part 621 corresponding to the first terminal part 611, a second corresponding part 622 corresponding to the second terminal part 612, a third corresponding part 623 corresponding to the third terminal part 613, or a fourth corresponding part 624 corresponding to the fourth terminal part 614. According to various embodiments of the disclosure, the numbers or the positions of the terminal parts and the corresponding parts corresponding thereto may be various without being limited to the embodiment of FIG. 6. The second assembly 300 may include a first indicator 631 for indicating the first value or the first range at near the first corresponding part 621. The second assembly 300 may include a second indicator 632 for indicating the second value or the second range at near the second corresponding part 622. The second assembly 300 may include a third indicator 633 for indicating the third value or the third range at near the third corresponding part 623. The second assembly 300 may include a fourth indicator 634 for indicating the fourth value or the fourth range at near the fourth corresponding part 624. For example, a lens optician may dispose a conductive terminal (not shown) on one corresponding part corresponding to the IPD applied to the first lens 330 and the second lens 340, referring to the indicators 631, 632, 633, and 634.

According to an embodiment of the disclosure, the first connector 610 may be electrically connected to the processor 510. For example, through a function (e.g., a general-purpose input/output (GPIO)) allowing a pin of the processor 510 to be used for input or output, the processor 510 may detect, through a corresponding pin, the position of a current flow between the first connector 610 and the second connector 620. The first terminal part 611 may be electrically connected to a first pin GPIO_1 of the processor 510. The second terminal part 612 may be electrically connected to a second pin GPIO_2 of the processor 510. The third terminal part 613 may be electrically connected to a third pin GPIO_3 of the processor 510. The fourth terminal part 614 may be electrically connected to a fourth pin GPIO_4 of the processor 510. For example, when the second assembly 300, in which a conductive terminal (not shown) is positioned in the first corresponding part 621, is attached to the first assembly 200, the first terminal part 611 may be in physical contact with the conductive terminal positioned in the first corresponding part 621. The processor 510 may detect a signal (e.g., a high signal) for connection between the first terminal part 611 and the conductive terminal through the first pin GPIO_1, and may determine that the IPD applied to the first lens 330 and the second lens 340 of the second assembly 300 corresponds to the first value or the first range. According to an embodiment of the disclosure, the first terminal part 611 may include a pair of first terminals 6111 and 6112, and when a voltage is applied to one first terminal 6111, the pair of first terminals 6111 and 6112 may be electrified through the conductive terminal positioned in the first corresponding part 621. The processor 510 may detect a high signal due to a current flow between the pair of first terminals 6111 and 6112 included in the first terminal part 611 through the first pin GPIO_1, and may determine that the IPD applied to the first lens 330 and the second lens 340 of the second assembly 300 corresponds to the first value or the first range. In the same manner, when the second assembly 300, in which a conductive terminal (not shown) is positioned in the second corresponding part 622, is attached to the first assembly 200, the processor 510 may detect a signal for connection between the second terminal part 612 and the conductive terminal through the second pin GPIO_2, and may determine that the IPD applied to the first lens 330 and the second lens 340 of the second assembly 300 corresponds to the second value or the second range. In the same manner, when the second assembly 300, in which a conductive terminal (not shown) is positioned in the third corresponding part 623, is attached to the first assembly 200, the processor 510 may detect a signal for connection between the third terminal part 613 and the conductive terminal through the third pin GPIO_3, and may determine that the IPD applied to the first lens 330 and the second lens 340 of the second assembly 300 corresponds to the third value or the third range. In the same manner, when the second assembly 300, in which a conductive terminal (not shown) is positioned in the fourth corresponding part 624, is attached to the first assembly 200, the processor 510 may detect a signal for connection between the fourth terminal part 614 and the conductive terminal through the fourth pin GPIO_4, and may determine that the IPD applied to the first lens 330 and the second lens 340 of the second assembly 300 corresponds to the fourth value or the fourth range. According to various embodiments of the disclosure, when a current flow is detected between the first connector 610 and the second connector 620, the processor 510 may also identify the attachment state of the second assembly 300.

According to various embodiments of the disclosure, a lens optician, corresponding to the IPD applied to the first lens 330 and the second lens 340, may also dispose conductive terminals on multiple corresponding parts among the first corresponding part 621, the second corresponding part 622, the third corresponding part 623, and the fourth corresponding part 624. For example, the second assembly 300, in which the first conductive terminal is positioned in the first corresponding part 621 and the second conductive terminal is positioned in the second corresponding part, may be attached to the first assembly 200. In this case, the first terminal part 611 may be in physical contact with the first conductive terminal positioned in the first corresponding part 621, and the second terminal part 612 may be in physical contact with the second conductive terminal positioned in the second corresponding part 622. The processor 510 may detect a first signal for connection between the first terminal part 611 and the first conductive terminal through the first pin GPIO_1, and may detect a second signal for connection between the second terminal part 612 and the second conductive terminal through the second pin GPIO_2. When the first signal and the second signal are detected, the processor 510 may determine that the IPD applied to the first lens 330 and the second lens 340 of the second assembly 300 corresponds to a fifth value or a fifth range. The fifth value may be different from the first value, the second value, the third value, or the fourth value. The fifth range may be different from the first range, the second range, the third range, or the fourth range. As described above, various IPDs may be designated in the second assembly 300 through a method of arranging conductive terminals on multiple corresponding parts among the first corresponding part 621, the second corresponding part 622, the third corresponding part 623, and the fourth corresponding part 624. The processor 510 may identify the IPD designated in the second assembly 300, based on signals generated from multiple pins among the first pin GPIO_1, the second pin GPIO_2, the third pin GPIO_3, and the fourth pin GPIO_4. According to various embodiments of the disclosure, a lens optician may refer to a guideline presenting the IPD indicated by a combination of the multiple corresponding parts. The second assembly 300 may include an indicator indicating the guideline.

According to an embodiment of the disclosure, the IPD acquisition instruction 522, which is stored in the memory 520 in FIG. 5, may include instructions for causing the processor 510 to execute the IPD acquisition method according to the embodiment of FIG. 6. According to an embodiment of the disclosure, the display control instruction 523, which is stored in the memory 520 in FIG. 5, may include instructions for causing the processor 510 to display the image data 525 through the display device 540, based on the IPD obtained according the embodiment of FIG. 6.

According to various embodiments of the disclosure, the first terminals 6111 and 6112 of the first terminal part 611, first terminals 6121 and 6122 of the second terminal part 612, first terminals 6131 and 6132 of the third terminal part 613, and/or first terminals 6141 and 6142 of the fourth terminal part 614 may be implemented as a flexible or an elastic structure, such as a pogo pin.

Figure 7:
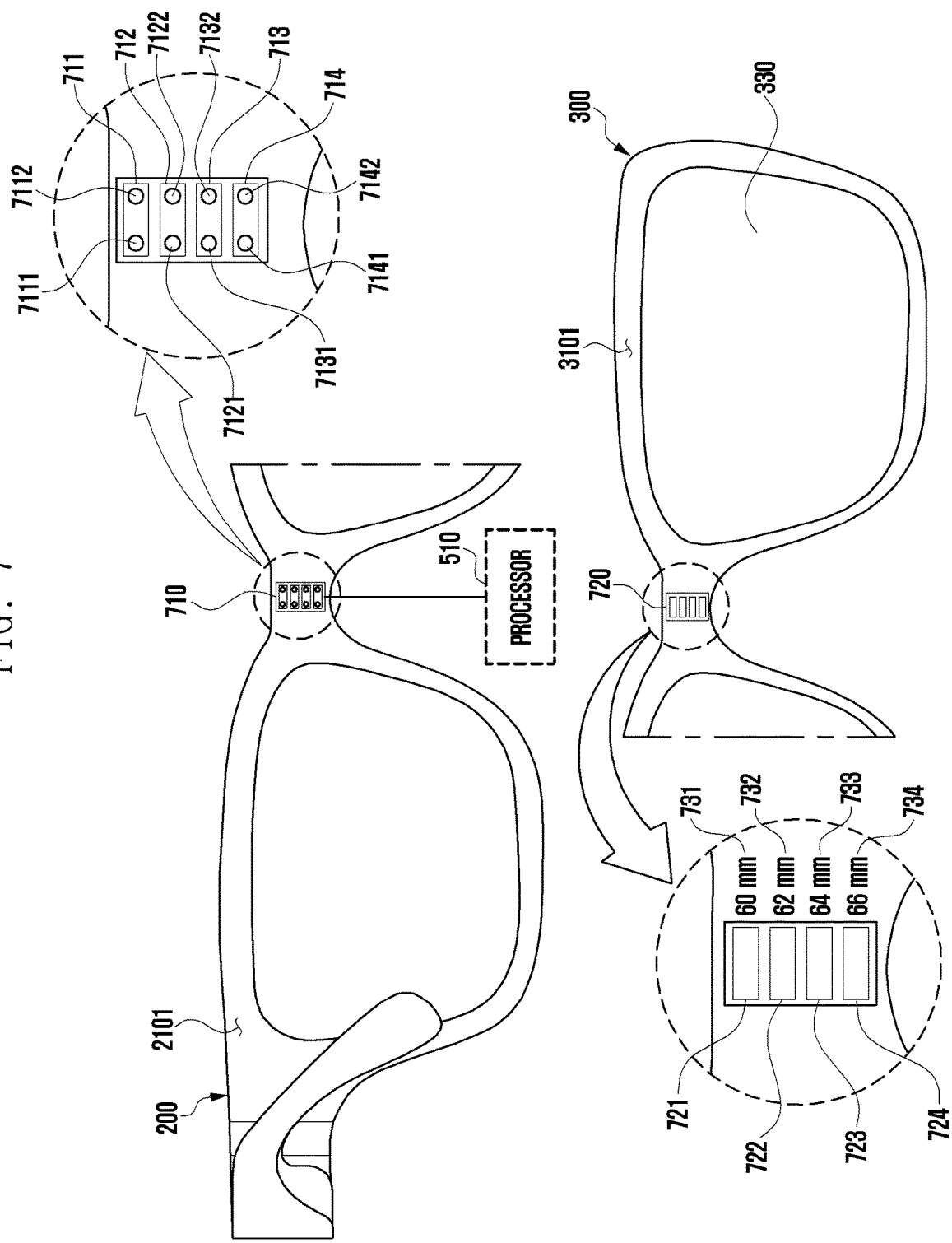
FIG. 7 is a reference view showing a manner in which a first assembly obtains an IPD according to an embodiment of the disclosure.

FIG. 7 is a reference view showing a manner in which a first assembly obtains an IPD according to an embodiment of the disclosure.

Referring to FIGS. 2 and 7, in an embodiment of the disclosure, the first assembly 200 may further include an optical sensor 710 which is positioned on the first surface 2101 facing the holder 310 of the second assembly 300 and includes at least one light-emitting part (e.g., a light-emitting diode (LED)) and at least one light-receiving part (e.g., a photodiode). According to various embodiments of the disclosure, the sensor module 530 in FIG. 5 may include the optical sensor 710. The second assembly 300 may further include a sensor corresponding part 720 positioned on the second surface 3101 facing the frame 210 of the first assembly 200. A lens optician may dispose at least one reflective member (not shown) having corresponding optical characteristics, such as light reflectivity or light scattering degree on the sensor corresponding part 720, based on the IPD applied to the first lens 330 and second lens 340. For example, the color, the area, or the position of the reflective member may change according to the IPD applied to the first lens 330 and the second lens 340. Light output from at least one light-emitting part of the optical sensor 710 may be reflected or scattered by the reflective member positioned in the sensor corresponding part 720 so as to be introduced into at least one light-receiving part of the optical sensor 710. The at least one light-receiving part may generate an electrical signal, based on the introduced light, and the processor 510 may identify the IPD, based on the electrical signal.

For example, the optical sensor 710 may include a first sensing area 711 corresponding to a first value or a first range, a second sensing area 712 corresponding to a second value or a second range, a third sensing area 713 corresponding to a third value or a third range, or a fourth sensing area 714 corresponding to a fourth value or a fourth range. The first value, the second value, the third value, and the fourth value may be different from one another. The first range, the second range, the third range, and the fourth range may be different. The sensor corresponding part 720 may include a first corresponding part 721 corresponding to the first sensing area 711, a second corresponding part 722 corresponding to the second sensing area 712, and a third corresponding part corresponding to the third sensing area 713, or a fourth corresponding part 724 corresponding to the fourth sensing area 714. The numbers or the positions of the sensing areas and the corresponding parts corresponding thereto may be various without being limited to the embodiment of FIG. 7. The second assembly 300 may include a first indicator 731 for indicating the first value or the first range at near the first corresponding part 721. The second assembly 300 may include a second indicator 732 for indicating the second value or the second range at near the second corresponding part 722. The second assembly 300 may include a third indicator 733 for indicating the third value or the third range at near the third corresponding part 723. The second assembly 300 may include a fourth indicator 734 for indicating the fourth value or the fourth range at near the fourth corresponding part 724. For example, referring to the indicators 731, 732, 733, and 734, a lens optician may arrange a first reflective member having a first color (e.g., a black color) on one corresponding part corresponding to the IPD applied to the first lens 330 and the second lens 340, and may arrange a second reflective member having a second color (e.g., a white color) different from the first color on the remaining corresponding parts.

For example, the second assembly 300, in which the first reflective member having the first color is positioned in the first corresponding part 721 and the second reflective member having the second color is positioned in the remaining corresponding parts 722, 723, and 724, may be attached to the first assembly 200. In this case, light output from a light-emitting part 7111 of the first sensing area 711 may be reflected or scattered by the first reflective member so as to be introduced into a light-receiving part 7112 of the first sensing area 711, and thus a first electrical signal may be generated from the light-receiving part 7112. Light output from a light-emitting part 7121 of the second sensing area 712 may be reflected or scattered by the second reflective member so as to be introduced into a light-receiving part 7122 of the second sensing area 712, and thus a second electrical signal may be generated from the light-receiving part 7122. Light output from a light-emitting part 7131 of the third sensing area 713 may be reflected or scattered by the second reflective member so as to be introduced into a light-receiving part 7132 of the third sensing area 713, and thus a third electrical signal may be generated from the light-receiving part 7132. Light output from a light-emitting part 7141 of the fourth sensing area 714 may be reflected or scattered by the second reflective member so as to be introduced into a light-receiving part 7142 of the fourth sensing area 714, and thus a fourth electrical signal may be generated from the light-receiving part 7142. The second electrical signal, the third electrical signal, and the fourth electrical signal may be substantially the same, but the first electrical signal may be substantially different from the second electrical signal, the third electrical signal, and the fourth electrical signal. The processor 510 may determine that the IPD applied to the first lens 330 and the second lens 340 corresponds to the first value or the first range, based on the difference between electrical signals generated from the first sensing area 711, the second sensing area 712, the third sensing area 713, and the fourth sensing area 714. In the same manner, the second assembly 300, in which a first reflective member having a first color is positioned in the second corresponding part 722 and a second reflective member having a second color is positioned in the remaining corresponding parts 721, 723, and 724, is attached to the first assembly 200, the processor 510 may determine that the IPD applied to the first lens 330 and the second lens 340 corresponds to the second value or the second range, based on the difference between electrical signals generated from the first sensing area 711, the second sensing area 712, the third sensing area 713, and the fourth sensing area 714. In the same manner, the second assembly 300, in which a first reflective member having a first color is positioned in the third corresponding part 723 and a second reflective member having a second color is positioned in the remaining corresponding parts 721, 722, and 724, is attached to the first assembly 200, the processor 510 may determine that the IPD applied to the first lens 330 and the second lens 340 corresponds to the third value or the third range, based on the difference between electrical signals generated from the first sensing area 711, the second sensing area 712, the third sensing area 713, and the fourth sensing area 714. In the same manner, the second assembly 300, in which a first reflective member having a first color is positioned in the fourth corresponding part 724 and a second reflective member having a second color is positioned in the remaining corresponding parts 721, 722, and 723, is attached to the first assembly 200, the processor 510 may determine that the IPD applied to the first lens 330 and the second lens 340 corresponds to the fourth value or the fourth range, based on the difference between electrical signals generated from the first sensing area 711, the second sensing area 712, the third sensing area 713, and the fourth sensing area 714.

According to various embodiments of the disclosure, a lens optician, corresponding to the IPD applied to the first lens 330 and the second lens 340, may dispose first reflective members on multiple corresponding parts among the first corresponding part 721, the second corresponding part 722, the third corresponding part 723, and the fourth corresponding part 724.

For example, the second assembly 300, in which a first reflective member is positioned in the first corresponding part 721 and the second corresponding part 722 and a second reflective member is positioned in the third corresponding part 723 and the fourth corresponding part 724, may be attached to the first assembly 200. A first electrical signal generated from the first sensing area 711 and a second electrical signal generated from the second sensing area 712 may be substantially the same. A third electrical signal generated from the third sensing area 713 and a fourth electrical signal generated from the fourth sensing area 714 may be substantially the same. The first electrical signal or the second electrical signal may be different from the third electrical signal or the fourth electrical signal. The processor 510 may determine that the IPD applied to the first lens 330 and the second lens 340 of the second assembly 300 corresponds to a fifth value or a fifth range, through comparison between the first electrical signal, the second electrical signal, the third electrical signal, and the fourth electrical signal. The fifth value may be different from the first value, the second value, the third value, or the fourth value. The fifth range may be different from the first range, the second range, the third range, or the fourth range.

As described above, various IPDs may be designated in the second assembly 300 through a method of arranging first reflective members on multiple corresponding parts among the first corresponding part 721, the second corresponding part 722, the third corresponding part 723, and the fourth corresponding part 724. The processor 510 may identify the IPD designated in the second assembly 300 through comparison between electrical signals generated from the first sensing area 711, the second sensing area 712, the third sensing area 713, and the fourth sensing area 714. According to various embodiments of the disclosure, a lens optician may refer to a guideline presenting the IPD indicated by a combination of the multiple corresponding parts. The second assembly 300 may include an indicator for indicating the guideline.

According to various embodiments (not shown) of the disclosure, a sensing area, which corresponds to multiple corresponding parts among the first corresponding part 721, the second corresponding part 722, the third corresponding part 723, and the fourth corresponding part 724, or corresponds to all of the first corresponding part 721, the second corresponding part 722, the third corresponding part 723, and the fourth corresponding part 724, may be provided. When the second assembly 300, in which the IPD is designated through a manner in which at least one reflective member is disposed in at least one corresponding part, is attached to the first assembly 200, the processor 510 may recognize the IPD, based on an electrical signal generated through the sensing area.

According to an embodiment of the disclosure, the IPD acquisition instruction 522, which is stored in the memory 520 in FIG. 5, may include instructions for causing the processor 510 to execute the IPD acquisition method according to the embodiment of FIG. 7. According to an embodiment of the disclosure, the display control instruction 523, which is stored in the memory 520 in FIG. 5, may include instructions for causing the processor 510 to display the image data 525 through the display device 540, based on the IPD obtained according the embodiment of FIG. 7.

Figure 8:
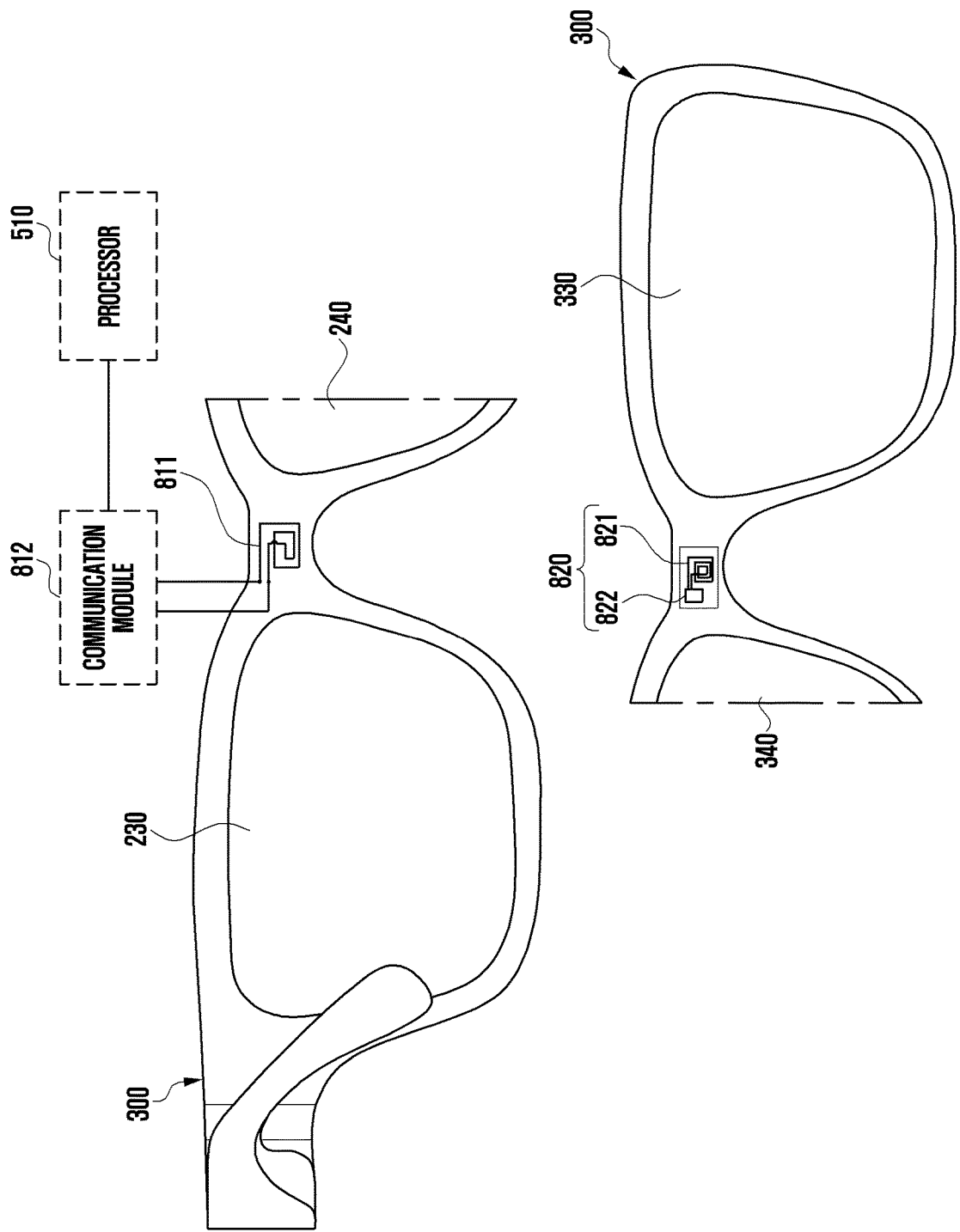
FIG. 8 is a reference view showing a manner in which a first assembly obtains an IPD according to an embodiment of the disclosure.

FIG. 8 is a reference view showing a manner in which a first assembly obtains an IPD according to an embodiment of the disclosure.

Referring to FIG. 8, according to an embodiment of the disclosure, the first assembly 200 may obtain the IPD stored in the second assembly 300 by using a radio frequency (RF). For example, referring to FIGS. 2 and 8, the second assembly 300 may include a tag 820 including a second antenna radiator 821 and a chip 822 electrically connected to the second antenna radiator 821. For example, the tag 820 may include a tag based on radio frequency identification (RFID), or a tag based on near field communication (NFC). Information on the IPD applied to the first lens 330 and the second lens 340 may be stored in the chip 822 of the tag 820. According to various embodiments of the disclosure, the tag 820 may be positioned integrally with the second assembly 300, inside the second assembly 300, or may be detachably positioned in the second assembly 300. The first assembly 200 may include a first antenna radiator 811, and a communication module (e.g., a reader) 812 (e.g., the communication module 190 in FIG. 1) electrically connected to the first antenna radiator 811. When the attachment state of the second assembly 300 is identified, the processor 510 may activate a communication mode (e.g., an RFID function or an NFC function) utilizing the first antenna radiator 811. In the communication mode, the communication module 812 may provide an emission current to the first antenna radiator 811. Accordingly, an inductive coupling may be formed by a magnetic field between the first antenna radiator 811 (e.g., a first coil) and the second antenna radiator 821 (e.g., a second coil). Wireless communication between the first assembly 200 and the second assembly 300 may be formed through a change in a magnetic field by inductive coupling. In the communication mode, the processor 510 may obtain the IPD stored in the chip 822 of the tag 820 through the first antenna radiator 811 and the communication module 812.

According to an embodiment of the disclosure, the IPD acquisition instruction 522, which is stored in the memory 520 in FIG. 5, may include instructions for causing the processor 510 to execute the IPD acquisition method according to the embodiment of FIG. 8. According to an embodiment of the disclosure, the display control instruction 523, which is stored in the memory 520 in FIG. 5, may include instructions for causing the processor 510 to display the image data 525 through the display device 540, based on the IPD obtained according the embodiment of FIG. 8.

According to various embodiments of the disclosure, in the embodiment of FIG. 6, when conductive terminals for IPD identification are not positioned in the first corresponding part 621, the second corresponding part 622, the third corresponding part 623, and the fourth corresponding part 624 of the second assembly 300, it may be difficult for the processor 510 to obtain the IPD applied to the first lens 330 and the second lens 340, based on the second assembly 300. In the embodiment of FIG. 7, when reflective members for IPD identification are not positioned in the first corresponding part 721, the second corresponding part 722, the third corresponding part 723, and the fourth corresponding part 724, it may be difficult for the processor 510 to obtain the IPD applied to the first lens 330 and the second lens 340, based on the second assembly 300. In the embodiment of FIG. 7, when reflective members having the same color are positioned in the first corresponding part 721, the second corresponding part 722, the third corresponding part 723, and the fourth corresponding part 724, it may be difficult for the processor 510 to obtain the IPD applied to the first lens 330 and the second lens 340, based on the second assembly 300. In the embodiment of FIG. 8, when information on the IPD is not stored in the tag 820, it may be difficult for the processor 510 to obtain the IPD applied to the first lens 330 and the second lens 340 from the second assembly 300, based on the second assembly 300. Referring to FIG. 5, in an embodiment of the disclosure, the eye-tracking module 550 may measure the IPD of a wearer. According to an embodiment of the disclosure, when the IPD applied to the first lens 330 and the second lens 340 cannot be obtained based on the second assembly 300 in the attached state of the second assembly 300, the IPD acquisition instruction 522 may include instructions for causing the processor 510 to obtain the IPD of a wearer by using the eye-tracking module 550. The display control instruction 523 may include instructions for causing the processor 510 to display the image data 525 through the display device 540, based on the IPD obtained through the eye-tracking module 550.

According to various embodiments of the disclosure, when the IPD applied to the first lens 330 and the second lens 340 cannot obtained based on the second assembly 300 in the attached state of the second assembly 300, the IPD acquisition instruction 522 may include instructions for causing the processor 510 to obtain the IPD, based on the input of a user through the input device 560. For example, the processor 510, according to the IPD acquisition instruction 522, may output an image, voice, or vibration for guiding a user to input or select the IPD through a corresponding device in the attached state of the second assembly 300. The processor 510, according to the IPD acquisition instruction 522, may detect user input or selection associated with the IPD through the input device 560. The display control instruction 523 may include instructions for causing the processor 510 to display the image data 525 through the display device 540, based on the IPD obtained through the input device 560. According to various embodiments of the disclosure, the input device 560 may include a switch positioned on the frame 210 in FIG. 2. For example, the switch may be a manual operation switch (or a selector switch) for a user to select one among various ranges or values for the IPD. According to some embodiments of the disclosure, the switch may also be implemented as a wheel key.

According to various embodiments of the disclosure, the processor 510 may be implemented to store the attachment/detachment state detection instruction 521, the IPD acquisition instruction 522, and/or the display control instruction 523. According to various embodiments of the disclosure, the processor 510 may also be implemented to include a first controller for executing the attachment/detachment state detection instruction 521, a second controller for executing the IPD acquisition instruction 522, and/or a third controller for executing the display control instruction 523.

Figure 9:
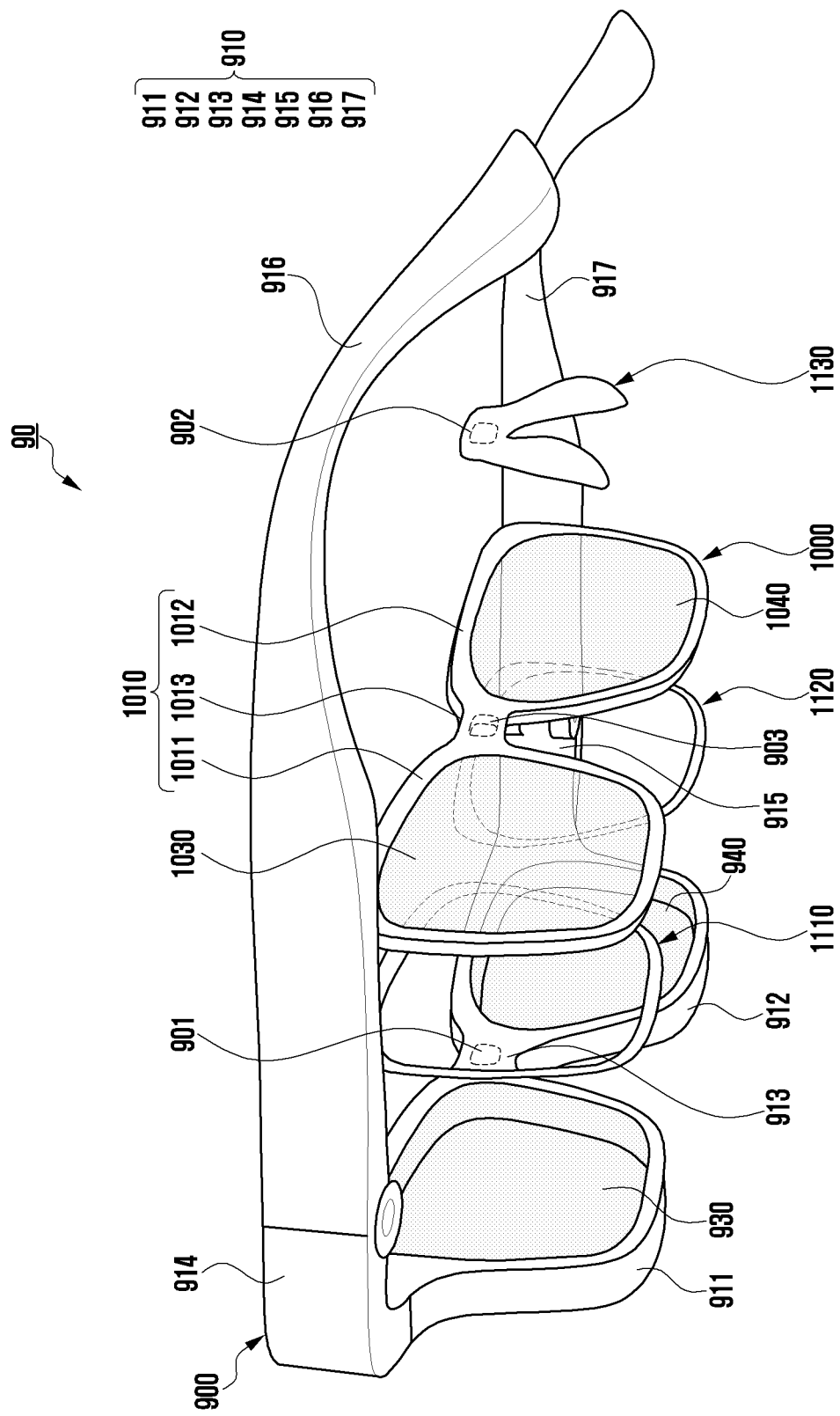
FIG. 9 is a perspective view of a wearable electronic device according to an embodiment of the disclosure.

FIG. 9 is a perspective view of a wearable electronic device according to an embodiment of the disclosure.

Referring to FIG. 9, in various embodiments of the disclosure, a wearable electronic device 90 may include a first assembly 900, a second assembly 1000, a first flexible member 1110, a second flexible member 1120, or a nose pad 1130.

For example, at least one of elements of the first assembly 900 may be the same as or similar to at least one of elements of the first assembly 200 in FIG. 2 or 3, and overlapping descriptions will be omitted hereinafter. For example, the first assembly 900 may be a glasses shape and may include a frame 910 (e.g., the frame 210 in FIG. 2 or 3), a first transparent display 930 (e.g., the first transparent display 230 in FIG. 2 or 3), and a second transparent display 940 (e.g., the second transparent display 240 in FIG. 2 or 3). For example, the frame 910 may include a first rim 911 (e.g., the first rim 211 in FIG. 2 or 3), a second rim 912 (e.g., the second rim 212 in FIG. 2 or 3), a bridge 913 (e.g., the bridge 213 in FIG. 2 or 3), a first end piece 914 (e.g., the first end piece 214 in FIG. 2 or 3), a second end piece 915 (e.g., the second end piece 215 in FIG. 2 or 3), a first temple 916 (e.g., the first temple 216 in FIG. 2 or 3), or a second temple 917 (e.g., the second temple 217 in FIG. 2 or 3).

For example, at least one of elements of the second assembly 1000 may be the same as or similar to at least one of elements of the second assembly 300 in FIG. 2 or 3, and overlapping descriptions will be omitted hereinafter. The second assembly 1000 may be a lens assembly including a lens positioned between the first assembly 900 and the eyes of a wearer. For example, the second assembly 1000 may include a holder (or a support member) 1010 (e.g., the holder 310 in FIG. 2 or 3), a first lens 1030 (e.g., the first lens 330 in FIG. 2 or 3), or a second lens 1040 (e.g., the second lens 340 in FIG. 2 or 3). When the holder 1010 is attached to the frame 910, the first lens 1030 positioned in the holder 1010 may face the first transparent display 1030. When the holder 1010 is attached to the frame 910, the second lens 1040 positioned in the holder 1010 may face the second transparent display 1040. Although not illustrated, the holder 1010 may be attached to the frame 910 by the attractive force between magnetic substances (e.g., the first magnetic substances 430 in FIG. 3) positioned in the frame 910 and magnetic substances (e.g., the second magnetic substances 440 in FIG. 2) positioned in the holder 1010.

According to an embodiment of the disclosure, the holder 1010 may be an integrated structure for disposing the first lens 1030 and the second lens 1040. For example, the holder 1010 may include a first portion 1011 to which the first lens 1030 is fixed, a second portion 1012 to which the second lens 1040 is fixed, and a third portion 1013 for connecting the first portion 1011 and a second portion 1012. The first portion 1011 may be a shape extending along the first rim 911 of the frame 910, and may surround and support at least a part of the first lens 1030. The second portion 912 may be a shape extending along the second rim 912 of the frame 910, and may surround and support at least a part of the second lens 1040. For example, the first flexible member 1110 may be the same as the first flexible member 410 in FIG. 2 or 3. The first flexible member 1110 may surround at least a part of a first space between the first transparent display 930 and the first lens 1030, and may be elastically positioned between the frame 910 of the first assembly 900 and the holder 1010 of the second assembly 1000. For example, the second flexible member 1120 may be the same as the second flexible member 420 in FIG. 2 or 3. The second flexible member 1120 may surround at least a part of a second space between the second transparent display 940 and the second lens 1040, and may be elastically positioned between the frame 910 of the first assembly 900 and the holder 1010 of the second assembly 1000.

According to an embodiment of the disclosure, the nose pad 1130 may be a portion placed on the nose of a user to support the wearable electronic device 90, and may be attachable to or detachable from the first assembly 900 or the second assembly 1000.

According to an embodiment of the disclosure, the first assembly 900 may obtain the IPD by the interaction between a first portion 901 positioned in the frame 910 and a second portion 902 positioned in the nose pad 1030.

For example, the manner, in which the first assembly 900 obtains the IPD, may be based on the embodiment of FIG. 6, and for example, the first assembly 900 may include a first connector (e.g., the first connector 610 in FIG. 6) included in the first portion 901 of the frame 910 and a second connector (e.g., the second connector 620 in FIG. 6) positioned in the second portion 902 of the nose pad 1130.

For another example, the way the first assembly 900 obtains the IPD may be based on the embodiment of FIG. 7, and for example, the first assembly 900 may include an optical sensor (e.g., the optical sensor 710 in FIG. 7) included in the first portion 901 of the frame 910 and a sensor corresponding part (e.g., the sensor corresponding part 720 in FIG. 7) positioned in the second portion 902 of the nose pad 1130.

For another example, the manner, in which the first assembly 900 obtains the IPD, may be based on the embodiment of FIG. 8, and for example, the first assembly 900 may include a first antenna radiator (e.g., the first antenna radiator 811 in FIG. 8) included in the first portion 901 of the frame 910 and a second antenna radiator (e.g., the second antenna radiator 821 in FIG. 8) positioned in the second portion 902 of the nose pad 1130. The nose pad 1130 may include a tag (e.g., the tag 820 in FIG. 8) including a chip (e.g., the chip 822 in FIG. 8) electrically connected to the second antenna radiator.

According to various embodiments of the disclosure, the holder 1010 may include an opening 903 positioned between the first portion 901 of the frame 910 and the second portion 902 of the nose pad 1130. The first portion 901 of the frame 910 and the second portion 902 of the nose pad 1130 may be positioned to face each other through the opening 903 of the holder 1010 and thus may be positioned close to each other.

According to an embodiment (not shown), the third portion 1013 of the holder 1010 and the nose pad 1130 may include a magnetic substance. For example, the holder 1010 and the nose pad 1130 may be coupled based on the magnetic substance.

According to an embodiment (not shown), the holder 1010 may include only the first portion 1011 to which the first lens is fixed and the second portion 1012 to which the second lens 1040 is fixed. For example, the nose pad 1130 may be positioned between the first portion 1011 and the second portion 1012 of the holder 1010.

Figure 10:
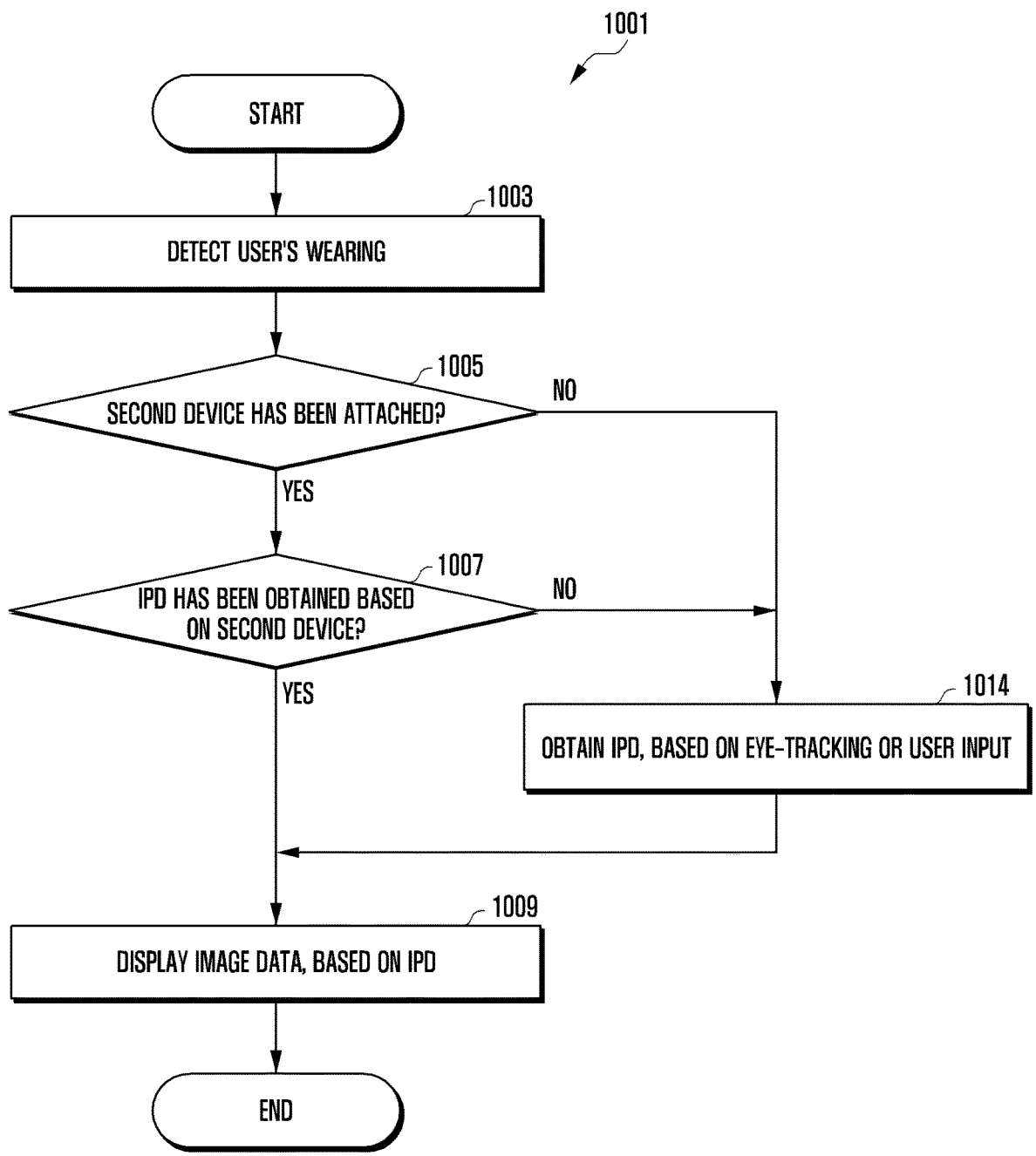
FIG. 10 illustrates an operation flow of a first assembly in FIG. 5 according to an embodiment of the disclosure.

FIG. 10 illustrates an operation flow 1001 of a first assembly according to an embodiment of the disclosure.

Figure 11:
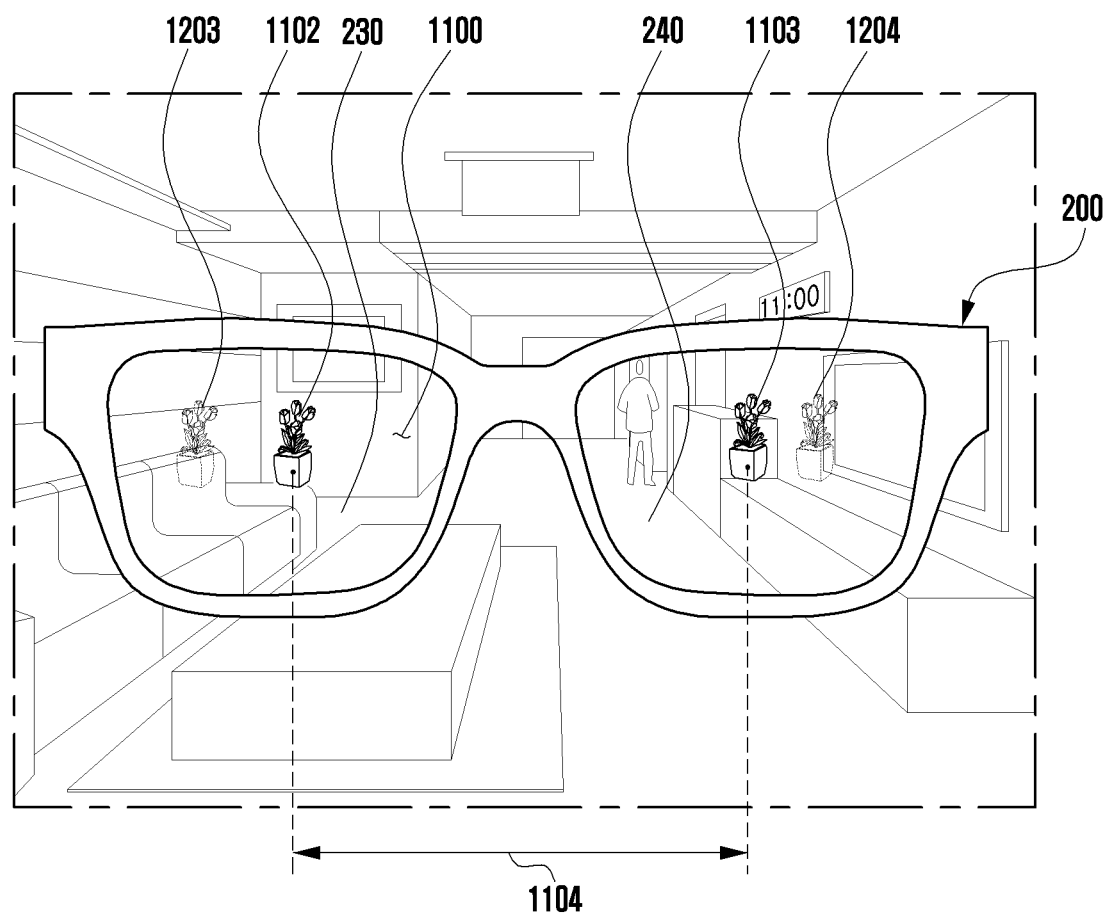
FIG. 11 is reference views of an operation flow in FIG. 10 according to an embodiment of the disclosure.

FIG. 11 is reference views of an operation flow according to an embodiment of the disclosure.

Referring to FIGS. 2, 5, and 10, in operation 1003, the processor 510 may detect the user's wearing. According to various embodiment of the disclosure, the processor 510 may detect whether a user wears the first assembly 200 by using at least one sensor (e.g., a proximity sensor, a grip sensor, or a pressure sensor).

According to an embodiment of the disclosure, in operation 1005, the processor 510 may identify whether the second assembly 300 is attached to the first assembly 200 through the sensor module 530.

According to an embodiment of the disclosure, when the attachment of the second assembly 300 is identified, the processor 510 may perform operation 1007. In operation 1007, the processor 510 may determine whether the IPD has been obtained based on the second assembly 300. For example, the manner of obtaining the IPD, based on the second assembly 300, may be implemented according to the embodiment of FIG. 6, the embodiment of FIG. 7, or the embodiment of FIG. 8. When the IPD is obtained based on the second assembly 300, the processor 510 may perform operation 1009. In operation 1009, the processor 510 may display the image data 525 stored in the memory 520 through the display device 540, based on the obtained IPD.

According to an embodiment of the disclosure, when the attachment state of the second assembly 300 is not identified in operation 1005, or the IPD is not obtained based on the second assembly 300 in operation 1007, the processor 510 may perform operation 1014. For example, in the embodiment of FIG. 6, when conductive terminals for IPD identification are not positioned in the first corresponding part 621, the second corresponding part 622, the third corresponding part 623, and the fourth corresponding part 624 of the second assembly 300, it may be difficult for the processor 510 to obtain the IPD, based on the second assembly 300. In operation 1014, the processor 510 may obtain the IPD of a wearer, based on an eye tracking or user input. For example, the processor 510 may obtain the IPD of a wearer through the eye-tracking module 550 in FIG. 5. For example, the processor 510 may obtain the IPD, based at least partially on the user input received through the input device 560 in FIG. 5. In operation 1009, the processor 510 may display the image data 525 through the display device 540, based on the obtained IPD. According to an embodiment of the disclosure, when the IPD of a user cannot be obtained because an eye tracking or user input is not performed in operation 1014, the processor 510 may display the image data 525 stored in the memory 520, based on a default IPD.

Referring to FIG. 11, for example, in a mode of augmented reality, the first assembly 200 may cause images (e.g., virtual images) 1102 and 1103 to be displayed on the first transparent display 230 and the second transparent display 240, and may enable a wearer to see the images 1102 and 1103 superimposed on the foreground (e.g., an actual image) 1100 of the eyes. According to an embodiment of the disclosure, in AR mode, the first assembly 200 may determine positions at which the images 1102 and 1103 are displayed on the first transparent display 230 and the second transparent display 240, based on the IPD 1104 obtained in operation 1005 or operation 1009 in FIG. 9. When images are displayed through the first transparent display 230 and the second transparent display 240 without considering the IPD (see reference numerals 1203 and 1204), visual discomfort, such as blurriness and a dizziness, may be caused.

According to an embodiment of the disclosure, a wearable electronic device (e.g., the electronic device 20 in FIG. 2 or 3) may include a first assembly (e.g., the first assembly 200 in FIG. 2 or 3). The first assembly may include a frame (e.g., the frame 210 in FIG. 2 or 3) mountable on a head, and a transparent display (e.g., the first transparent display 230 or the second transparent display 240 in FIG. 2 or 3) which is positioned on the frame to face an eye when the frame is mounted on a head and on which an image is displayed in a designated mode. The wearable electronic device may include a second assembly (e.g., the second assembly 300 in FIG. 2 or 3). The second assembly may include a holder (e.g., the holder 310 in FIG. 2 or. FIG. 3) attachable to or detachable from the frame, a lens (e.g., the first lens 330 or the second lens 340 in FIG. 2 or 3) which is positioned in the holder and faces the transparent display when the holder is attached to the frame, and a flexible member (e.g., the first flexible member 410 or the second flexible member 420 in FIG. 2 or 3) which surrounds at least a part of a space between the transparent display and the lens and is positioned between the holder and the frame.

According to an embodiment of the disclosure, the designated mode may include augmented reality (AR).

According to an embodiment of the disclosure, the transparent display (e.g., the first transparent display 230 or the second transparent display 240 in FIG. 2 or 3) may include a projection-type transparent display.

According to an embodiment of the disclosure, the first assembly (e.g., the first assembly 200 in FIG. 2 or 3) may further include a projector (e.g., the first projector 231 in FIG. 2 and the second projector 241 in FIG. 3) configured to project light of the image to the transparent display (e.g., the first transparent display 230 or the second transparent display 240 in FIG. 2 or 3). At least a part of the projector may be positioned in the space.

According to an embodiment of the disclosure, the transparent display (e.g., the first transparent display 230 or the second transparent display 240 in FIG. 2 or 3) may include a see-through-type transparent display.

According to an embodiment of the disclosure, the wearable electronic device may further include at least one first magnetic substance (e.g., the multiple first magnetic substances 430 in FIG. 3) positioned in the frame (e.g., the frame 210 in FIG. 2 or 3). The wearable electronic device may further include at least one second magnetic substance (e.g., the multiple second magnetic substances 440 in FIG. 2) positioned in the holder (e.g., the holder 310 in FIG. 2 or 3) to face the at least one first magnetic substance.

According to an embodiment of the disclosure, a flexible member (e.g., the first flexible member 410 or the second flexible member 420 in FIG. 2 or 3) may be interposed between the at least one first magnetic substance (e.g., the multiple first magnetic substances 430 in FIG. 3) and the at least one second magnetic substance (e.g., the multiple second magnetic substances 440 in FIG. 2).

According to an embodiment of the disclosure, the first assembly (e.g., the first assembly 200 in FIG. 5) may further include a processor (e.g., the processor 510 in FIG. 5) and a memory (e.g., the memory 520 in FIG. 5) electrically connected to the processor. The memory, when being executed, may be configured to store instructions for causing the processor to obtain an IPD for the lens (e.g., the first lens 330 and the second lens 340 in FIG. 2 or 3) and to display the image on the transparent display (e.g., the first transparent display 230 and the second transparent display 240 in FIG. 2 or 3), based on the IPD, when the holder (e.g., the holder 310 in FIG. 2 or 3) is attached to the frame (e.g., the frame 210 in FIG. 2 or 3).

According to an embodiment of the disclosure, the first assembly (e.g., the first assembly 200 in FIG. 6) may further include a first connector (e.g., the first connector 610 in FIG. 6) electrically connected to the processor (e.g., the processor 510 in FIG. 6). The second assembly (e.g., the second assembly 300 in FIG. 6) may further include a second connector (e.g., the second connector 620 in FIG. 6). The processor may be configured to determine the IPD, based on the position of a current flow between the first connector and the second connector.

According to an embodiment of the disclosure, the first connector (e.g., the first connector 610 in FIG. 6) may include a first terminal part (e.g., the first terminal part 611 in FIG. 6) corresponding to a first value, and a second terminal part (e.g., the second terminal part 612 in FIG. 6) corresponding to a second value different from the first value. The second connector (e.g., the second connector 620 in FIG. 6) may include a first corresponding part (e.g., the first corresponding part 621 in FIG. 6) facing the first terminal part and a second corresponding part (e.g., the second corresponding part 622 in FIG. 6) facing the second terminal part when the holder (e.g., the holder 310 in FIG. 6) is attached to the frame (e.g., the frame 210 in FIG. 6), and a conductive terminal positioned in the first corresponding part or the second corresponding part. The processor may be configured to determine the IPD as the first value when a current flow occurs in the first terminal part by the conductive terminal. The processor may be configured to determine the IPD as the second value when a current flow occurs in the second terminal part by the conductive terminal.

According to an embodiment of the disclosure, the second assembly (e.g., the second assembly 300 in FIG. 6) may further include a first indicator (e.g., the first indicator 631 in FIG. 6) positioned near the first corresponding part (e.g., the first corresponding part 621 in FIG. 6) and configured to indicate the first value. The second assembly may further include a second indicator (e.g., the second indicator 632 in FIG. 6) positioned near the second corresponding part (e.g., the second corresponding part 622 in FIG. 6) and configured to indicate the second value.

According to an embodiment of the disclosure, the first assembly (e.g., the first assembly 200 in FIG. 7) may include at least one light-emitting part and at least one light-receiving part and may further include an optical sensor (e.g., the optical sensor 710 in FIG. 7) electrically connected to the processor (e.g., the processor 510 in FIG. 7). The second assembly (e.g., the second assembly 300 in FIG. 7) may further include a sensor corresponding part (e.g., the sensor corresponding part 720 in FIG. 7) which faces the optical sensor when the holder (e.g., the holder 310 in FIG. 7) is attached to the frame (e.g., the frame 210 in FIG. 7) and on which a reflective member is positioned based on the IPD. The processor may be configured to determine the IPD, based on an electrical signal output from the at least one light-receiving part.

According to an embodiment of the disclosure, the first assembly (e.g., the first assembly 200 in FIG. 8) may further include a first coil (e.g., the first antenna radiator 811 in FIG. 8) and a communication module (e.g., the communication module 812 of FIG. 8) electrically connected to the first coil, and the processor (e.g., the processor 510 in FIG. 8) may be configured to obtain the IPD from the second assembly through the communication module. The IPD may be obtained from the second assembly (e.g., the second assembly 300 in FIG. 8) through wireless communication.

According to an embodiment of the disclosure, the second assembly (e.g., the second assembly 300 in FIG. 8) may further include a tag (e.g., the tag 820 in FIG. 8) including a second coil (e.g., the second antenna radiator 821 in FIG. 8) which faces the first coil when the holder (e.g., the holder 310 in FIG. 8) is attached to the frame (e.g., the frame 210 in FIG. 8), and a chip (e.g., the chip 822 in FIG. 8) electrically connected to the second coil and configured to store the IPD. The communication module may be configured to receive the IPD from the chip through the first coil so as to deliver the received IPD to the processor.

According to various embodiments of the disclosure, a wearable electronic device (e.g., the wearable electronic device 20 in FIG. 2 or 3) may include a first assembly (e.g., the first assembly 200 in FIG. 2 or 3). The first assembly may include a frame (e.g., the frame 210 in FIG. 2 or 3) mountable to a head, a transparent display (e.g., the first transparent display 230 or the second transparent display 240 in FIG. 2 or 3) positioned on the frame to face eyes when the frame is mounted on a head, a processor (e.g., the processor 510 in FIG. 5), and a memory (e.g., the memory 520 in FIG. 5) electrically connected to the processor and configured to store image data. The wearable electronic device may include a second assembly (e.g., the second assembly 300 in FIG. 2 or 3). The second assembly may include a holder (e.g., the holder 310 in FIG. 2 or 3) attachable to or detachable from the frame, and a lens (e.g., the first lens 330 or the second lens 340 in FIG. 2 or 3) which is positioned in the holder and faces the transparent display when the holder is attached to the frame. The memory, when being executed, may be configured to store instructions for causing the processor to obtain an inter-pupillary distance (IPD) for the lens and to display the image on the transparent display, based on the IPD, when the holder is attached to the frame.

According to various embodiments of the disclosure, the first assembly (e.g., the first assembly 200 in FIG. 6) may include a first connector (e.g., the first connector 610 in FIG. 6) electrically connected to the processor. The first connector may include a first terminal part (e.g., the first terminal part 611 in FIG. 6) corresponding to a first value, and a second terminal part (e.g., the second terminal part 612 in FIG. 6) corresponding to a second value different from the first value. The second assembly (e.g., the second assembly 300 in FIG. 6) may further include a second connector (e.g., the second connector 620 in FIG. 6). The second connector may include a first corresponding part (e.g., the first corresponding part 621 in FIG. 6) facing the first terminal part and a second corresponding part (e.g., the second corresponding part 622 in FIG. 6) facing the second terminal part when the holder (e.g., the holder 310 in FIG. 6) is attached to the frame (e.g., the frame 210 in FIG. 6), and a conductive terminal positioned in the first corresponding part or the second corresponding part. The processor may be configured to determine the IPD as the first value when a current flow occurs in the first terminal part by the conductive terminal. The processor may be configured to determine the IPD as the second value when a current flow occurs in the second terminal part by the conductive terminal.

According to various embodiments of the disclosure, the second assembly (e.g., the second assembly 300 in FIG. 6) may further include a first indicator (e.g., the first indicator 631 in FIG. 6) positioned near the first corresponding part (e.g., the first corresponding part 621 in FIG. 6) and configured to indicate the first value. The second assembly may further include a second indicator (e.g., the second indicator 632 in FIG. 6) positioned near the second corresponding part (e.g., the second corresponding part 622 in FIG. 6) and configured to indicate the second value.

According to various embodiments of the disclosure, the first assembly (e.g., the first assembly 200 in FIG. 7) may include at least one light-emitting part and at least one light-receiving part, and may further include an optical sensor (e.g., the optical sensor 710 in FIG. 7) electrically connected to the processor (e.g., the processor 510 in FIG. 7). The second assembly (e.g., the second assembly 300 in FIG. 7) may further include a sensor corresponding part (e.g., the sensor corresponding part 720 in FIG. 7) which faces the optical sensor when the holder (e.g., the holder 310 in FIG. 7) is attached to the frame (e.g., the frame 210 in FIG. 7) and on which a reflective member is positioned based on the IPD. The processor may be configured to determine the IPD, based on an electrical signal output from the at least one light-receiving part.

According to various embodiments of the disclosure, the first assembly (e.g., the first assembly 200 in FIG. 8) may further include a first coil (e.g., the first antenna radiator 811 in FIG. 8), and a communication module (e.g., the communication module 812 in FIG. 8) electrically connected to the first coil. The second assembly (e.g., the second assembly 300 in FIG. 8) may further include a tag (e.g., the tag 820 in FIG. 8) including a second coil (e.g., the second antenna radiator 821 in FIG. 8) which faces the first coil when the holder (e.g., the holder 310 in FIG. 8) is attached to the frame (e.g., the frame 210 in FIG. 8), and a chip (e.g., the chip 822 in FIG. 8) electrically connected to the second coil and configured to store the IPD. The communication module may be configured to receive the IPD from the chip through the first coil so as to deliver the received IPD to the processor.

According to various embodiments of the disclosure, the first assembly (e.g., the first assembly 200 in FIG. 5) may further include a user interface (e.g., an input device 570 in FIG. 5). The processor (e.g., the processor 510 in FIG. 5) may be configured to obtain the IPD, based at least partially on the user input received through the user interface.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. A wearable electronic device comprising:
  a first assembly comprising:
    a frame mountable on a head, and
    a transparent display which is disposed on the frame to face an eye when the frame is mounted on the head and on which an image is displayed; and
  a second assembly comprising:
    a holder attachable to or detachable from the frame,
    a lens which is positioned in the holder and faces the transparent display when the holder is attached to the frame, and
  wherein the first assembly further comprises at least one processor and a memory electrically connected to the at least one processor, and
  wherein the memory is configured to store instructions that, when executed by the at least one processor, cause the wearable electronic device to:

when the holder is attached to the frame, obtain a signal with respect to an inter-pupillary distance (IPD) for the lens, and display the image on the transparent display, based on the signal, wherein the first assembly further comprises a first connector electrically connected to the at least one processor, wherein the second assembly further comprises a second connector, and wherein the at least one processor is configured to determine the IPD, based on the signal according to a position of a current flow between the first connector and the second connector.

2. The wearable electronic device of claim 1, wherein the instructions, when executed by the at least one processor, is configured to cause the wearable electronic device to display the image through the transparent display in a designated mode, wherein the designated mode comprises augmented reality (AR).

3. The wearable electronic device of claim 1, wherein the transparent display comprises a projection-type transparent display.

4. The wearable electronic device of claim 3, wherein the first assembly further comprises a projector configured to project light of the image to the transparent display, and wherein at least a part of the projector is positioned in a space.

5. The wearable electronic device of claim 1, wherein the transparent display comprises a see-through-type transparent display.

6. The wearable electronic device of claim 1, further comprising:

at least one first magnetic substance positioned in the frame; and at least one second magnetic substance positioned in the holder to face the at least one first magnetic substance.

7. The wearable electronic device of claim 6, further comprising:

a flexible member which surrounds at least a part of a space between the transparent display and the lens and is positioned between the holder and the frame, wherein the flexible member is interposed between a position of the at least one first magnetic substance and a position of the at least one second magnetic substance.

8. The wearable electronic device of claim 1, wherein the first connector comprises:

a first terminal part corresponding to a first value, and a second terminal part corresponding to a second value different from the first value, wherein the second connector comprises:

a first corresponding part facing the first terminal part and a second corresponding part facing the second terminal part when the holder is attached to the frame, and a conductive terminal positioned in the first corresponding part or the second corresponding part, and wherein the at least one processor is configured to:

determine the IPD as the first value based on the signal generated when a current flow occurs in the first terminal part by the conductive terminal, and determine the IPD as the second value based on the signal generated when a current flow occurs in the second terminal part by the conductive terminal.

9. The wearable electronic device of claim 8, wherein the second assembly further comprises:

a first indicator positioned near the first corresponding part and configured to indicate the first value; and a second indicator positioned near the second corresponding part and configured to indicate the second value.

10. The wearable electronic device of claim 1, further comprising:

a flexible member which surrounds at least a part of a space between the transparent display and the lens and is positioned between the holder and the frame, wherein the frame, the holder, and the flexible member form a seal structure to deter an introduction of water or dust into the space between the transparent display and the lens.

11. The wearable electronic device of claim 1, further comprising:

a flexible member which surrounds at least a part of a space between the transparent display and the lens and is positioned between the holder and the frame, wherein the frame includes a first recess, wherein the holder includes a second recess, wherein a portion of the flexible member is positioned in the first recess, wherein another portion of the flexible member is inserted into the second recess, and wherein the first recess and the second recess are configured to guide coupling between the frame and the holder.

12. A wearable electronic device comprising:

a first assembly comprising:

a frame mountable on a head, and a transparent display which is disposed on the frame to face an eye when the frame is mounted on a head and on which an image is displayed; and a second assembly comprising:

a holder attachable to or detachable from the frame, and a lens which is positioned in the holder and faces the transparent display when the holder is attached to the frame, wherein the first assembly further comprises at least one processor and a memory electrically connected to the at least one processor, and wherein the memory is configured to store instructions that, when executed by the at least one processor, cause the wearable electronic device to:

when the holder is attached to the frame, obtain a signal with respect to an inter-pupillary distance (IPD) for the lens, and display the image on the transparent display, based on the signal, wherein the first assembly further comprises a first coil and a communication module electrically connected to the first coil, and wherein the at least one processor is configured to obtain the signal from the second assembly through the communication module.

13. The wearable electronic device of claim 12, wherein the second assembly further comprises a tag comprising:

a second coil which faces the first coil when the holder is attached to the frame, and a chip electrically connected to the second coil and configured to store the IPD, and wherein the communication module is configured to receive the signal with respect to the IPD from the chip through the first coil.

14. The wearable electronic device of claim 12, further comprising:
- a flexible member which surrounds at least a part of a space between the transparent display and the lens and is positioned between the holder and the frame,
- wherein the frame includes a first recess,
- wherein the holder includes a second recess,
- wherein a portion of the flexible member is positioned in the first recess,
- wherein another portion of the flexible member is inserted into the second recess, and
- wherein the first recess and the second recess are configured to guide coupling between the frame and the holder.

15. A wearable electronic device comprising:
- a first assembly comprising:
  - a frame mountable on a head, and
  - a transparent display which is disposed on the frame to face an eye when the frame is mounted on a head and on which an image is displayed; and
- a second assembly comprising:
  - a holder attachable to or detachable from the frame, and
  - a lens which is positioned in the holder and faces the transparent display when the holder is attached to the frame,
- wherein the first assembly further comprises at least one processor and a memory electrically connected to the at least one processor,
- wherein the memory is configured to store instructions that, when executed by the at least one processor, cause the wearable electronic device to:
  - when the holder is attached to the frame, obtain a signal with respect to an inter-pupillary distance (IPD) for the lens, and
  - display the image on the transparent display, based on the signal,
- wherein the first assembly comprises at least one light-emitting part and at least one light-receiving part and further comprises an optical sensor electrically connected to the at least one processor,
- wherein the second assembly further comprises a sensor corresponding part which faces the optical sensor when the holder is attached to the frame and on which a plurality of reflective members are positioned based on the IPD, a first reflective member of the plurality of reflective members having a first color and a second reflective member of the plurality of reflective members having a second color, and
- wherein the at least one processor is configured to determine the IPD, based on the signal output from the at least one light-receiving part according to received light due to a color of a reflective member of the plurality of reflective members.

* * * * *